United States Patent
Higuchi et al.

(10) Patent No.: US 8,416,872 B2
(45) Date of Patent: Apr. 9, 2013

(54) RADIO COMMUNICATION APPARATUS AND A RADIO COMMUNICATION METHOD

(75) Inventors: Kenichi Higuchi, Yokohama (JP);
Noriyuki Maeda, Yokohama (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 11/909,718

(22) PCT Filed: Mar. 27, 2006

(86) PCT No.: PCT/JP2006/306105
§ 371 (c)(1),
(2), (4) Date: Dec. 17, 2008

(87) PCT Pub. No.: WO2006/106613
PCT Pub. Date: Oct. 12, 2006

(65) Prior Publication Data
US 2009/0213955 A1      Aug. 27, 2009

(30) Foreign Application Priority Data

| Mar. 31, 2005 | (JP) | 2005-105494 |
| Jun. 14, 2005 | (JP) | 2005-174393 |
| Aug. 23, 2005 | (JP) | 2005-241904 |

(51) Int. Cl.
*H04B 7/02* (2006.01)
*H04L 1/02* (2006.01)

(52) U.S. Cl.
USPC .......................................... 375/267; 375/358

(58) Field of Classification Search ............. 375/358, 375/267
See application file for complete search history.

(56) References Cited

U.S. PATENT DOCUMENTS

| 6,687,492 | B1 | 2/2004 | Sugar et al. |
| 7,319,718 | B2 * | 1/2008 | Roh et al. ........... 375/224 |
| 7,751,352 | B2 * | 7/2010 | Seo et al. ........... 370/310 |
| 2002/0147953 | A1 * | 10/2002 | Catreux et al. ........ 714/746 |
| 2003/0103584 | A1 | 6/2003 | Bjerke et al. |
| 2003/0125040 | A1 | 7/2003 | Walton et al. |
| 2004/0047321 | A1 | 3/2004 | Bui |

(Continued)

FOREIGN PATENT DOCUMENTS

| JP | 2000101667 A | 4/2000 |
| JP | 2000-261398 A | 9/2000 |

(Continued)

OTHER PUBLICATIONS

English Translation of International Preliminary Report on Patentability Chapter 1 for PCT/JP2006/306105, Oct. 3, 2007.*

(Continued)

*Primary Examiner* — Shuwang Liu
*Assistant Examiner* — Nader Bolourchi
(74) *Attorney, Agent, or Firm* — Osha Liang LLP

(57) ABSTRACT

The radio communication apparatus includes
two or more antennas,
a receiving unit for receiving a notice signal from a communication partner,
two or more units for changing the number of data sequences and for coupling to the antennas according to two or more transmitting methods out of a MIMO multiplexing method, a MIMO diversity method, and an adaptive array antenna method,
a selecting unit for selecting at least one out of the two or more units based on the notice signal, and
a transmitting unit for notifying the communication partner of the transmission method corresponding to the selected unit.

10 Claims, 36 Drawing Sheets

U.S. PATENT DOCUMENTS

| | | | |
|---|---|---|---|
| 2004/0062221 A1 | 4/2004 | Gopalakrishnan et al. | |
| 2004/0082356 A1* | 4/2004 | Walton et al. | 455/522 |
| 2004/0184398 A1 | 9/2004 | Walton et al. | |
| 2005/0043031 A1 | 2/2005 | Cho et al. | |
| 2006/0114813 A1* | 6/2006 | Seki et al. | 370/208 |
| 2006/0209937 A1* | 9/2006 | Tanaka et al. | 375/219 |

FOREIGN PATENT DOCUMENTS

| | | |
|---|---|---|
| JP | 2004-194262 A | 7/2004 |
| JP | 2004-274103 A | 9/2004 |
| TW | 200302642 | 8/2003 |
| TW | I224405 | 11/2004 |
| WO | 0215433 A1 | 2/2002 |
| WO | 03041299 A1 | 5/2003 |
| WO | 03/085876 A1 | 10/2003 |
| WO | 2004014013 A1 | 2/2004 |
| WO | 2004/039011 A2 | 5/2004 |
| WO | 2004056022 A2 | 7/2004 |
| WO | 2005/004376 A1 | 1/2005 |

OTHER PUBLICATIONS

G. J. Foschini "Layered Space-Time Architecture for Wireless Communication in a Fading Environment When Using Multi-Element Antennas" Bell Labs Tech. J., pp. 41-59, Autumn 1996.

V. Tarokh, H. Jafarkhani, and R. Calderbank "Space-Time Block Coding for Wireless Communications: Performance Results" IEEE Journal on Selected Areas in Communications, vol. 17, No. 3, Mar. 1999.

Paulraj et al., "Transmit Optimization for Spatial Multiplexing in Presence of Spatial Fading Correlation".

Taiwanese Office Action for Taiwanese Application No. 095110907, mailed on Nov. 25, 2008 (26 pages).

Japanese Office Action for Application No. 2005-241904, mailed on Jan. 26, 2010 (9 pages).

Takatoshi Sugiyama et al., Implementation and Performance Evaluation of Simple SDM-COFDM Prototype Using Propagation Coefficient Matrix Tracking for Fast Fading MIMO Channels, IEICE Transactions of Communications, Jan. 1, 2005, vol. E88-B, No. 1, pp. 58-65.

Manabu Inoue, et al., A Study of MIMO-OFDM System Employing Error Detection Code, IEIC Technical Report, Mar. 8, 2004, vol. 103 No. 716, pp. 105-110, CS2003-176.

Yuanrun Teng, et al., Performance Analysis of SDM-OFDM System with Adaptive Modulation Method over MIMO Channels, IEICE Technical Report, May 16, 2003, vol. 103 No. 66, pp. 75-82, RCS2003-41 (erroneously listed on the translation of the JP Office Action for Application No. 2005-241904 as: Hideo Kobayahi, et al., SDM-OFDM System Employing Adaptive Modulation for MIMO Channel, IEIC Technical Report, May 16, 2003, vol. 103 No. 66, pp. 75-82, RCS2003-41).

Norihiko Morinaga, et al., A Study of MIMO/AMS employed Transmit Power Control, Proceedings of the IEICE General Conference 2003, Communication 1, Mar. 3, 2003, p. 621, B-5-162.

International Search Report issued in PCT/JP2006/306105 dated May 30, 2006, with English translation, 11 pages.

NTT DoCoMo, NEC, Sharp, "Transmission Phase Control for Compensating High Fading Correlation in MIMO Multiplexing," 3GPP TSG RAN WG1 #42 on LTE, London, UK, Aug. 29-Sep. 2, 2005, 4 pages.

Rohit U. Nabar, et al., "Transmit Optimization for Spatial Multiplexing in the Presence of Spatial Fading Correlation," Global Telecommunications Conference, 2001, Globecom '01, IEEE, vol. 1, Nov. 2001, pp. 131-135, 5 page.

3GPP TR25.876 V1.7.0, Aug. 2008, Technical Report, "3rd Generation Partnership Project; Technical Specification Group Radio Access Network; Multiple-Input Multiple Output in UTRA,", pp. 1-23 & 47-51, 28 pages.

NTT DoCoMo, NEC, Sharp, "Investigation on Optimum Chunk Bandwidth in Evolved UTRA Downlink," 3GPP TSG RAN WG1 #42 on LTE, R1-050708, Aug. 29, 2005, 9 pages.

Seokhyun Yoon, et al., "Orthogonal Frequency Division Multiple Access with an Aggregated Sub-channel Structure and Statistical Channel Quality Measurement," Vehicular Technology Conference, 2004. VTC2004-Fall. 2004, IEEE 60th, vol. 2, Sep. 2004, pp. 1023-1027, 5 pages.

Hangjun Chen, et al., "Layered MIMO Scheme with Antenna Grouping," 2004 IEEE International Conference on Communications, vol. 1, Jun. 2004, pp. 478-482, 5 pages.

Japanese Office Action for Application No. 2010-19564, mailed on Jun. 28, 2011 (6 pages).

Japanese Office Action for Application No. 2009-191401, mailed on Dec. 13, 2011 (6 pages).

Pangan Ting et. al, "Efficient Multiuser MIMO Scheduling Strategies", Vehicular Technology Conference, 2004. VTC 2004-Fall, Sep. 29, 2004. vol. 2, pp. 1139-1142.

Lei Li et al., "An Integrated Subchannel Scheduling Algorithm for Adaptive Modulation and Coding (AMC) MIMO-OFDM Wireless Systems", Communications, 2004 and 5th International Symposium on, Sep. 1, 2004, vol. 1, pp. 90-94.

Japanese Office Action for Application No. 2009-191401, mailed on Apr. 24, 2012 (5 pages).

LG Electronics, "Multiplexing Chain for MIMO System", 3GPP TSG RAN WG1 #36, R1-040259, Malagua, Spain, Feb. 16-20, 2004.

Japanese Office Action for Application No. 2010-074494, mailed on Apr. 3, 2012 (5 pages).

Mitsubishi Electric, "DSTTD with Sub-Group Rate Control", 3GPP TSG RAN WGI #33, R1-030694, New York, USA, Aug. 25-29, 2003 (10 pages).

Patent Abstracts of Japan for Japanese Publication No. 2000-101667, publication date Apr. 7, 2000 (1 page).

English abstract for WO 03041299, publication date May 15, 2003, esp@cenet database, (2 page).

English abstract for WO 0215433, publication date Feb. 21, 2002 esp@cenet database, (1 page).

3GPP TR25.876 V1.6.1, Aug. 2004, Technical Report, "3rd Generation Partnership Project; Technical Specification Group Radio Access Network; Multiple-Input Multiple Output in UTRA," 5 pages.

Japanese Office Action for Application No. 2010-074494, mailed on Jun. 24, 2012 (5 pages).

Akinori Taira, et al., "A Transmission Performance of MIMO-OFDM systems Using SDM & STC", Technical report of IEICE, Jun. 13, 2003, vol. 103, No. 126, pp. 85-90, RCS2003-66.

Junichiro Kawamoto, et al., "Experimental Comparisions of MIMO Multiplexing and MIMO Diverisity in Spread OFDM Packet Radio Access", Proceedings of the IEICE General Conference, 2005, Communication 1, Mar. 7, 2005, p. 524, B-5-75.

* cited by examiner

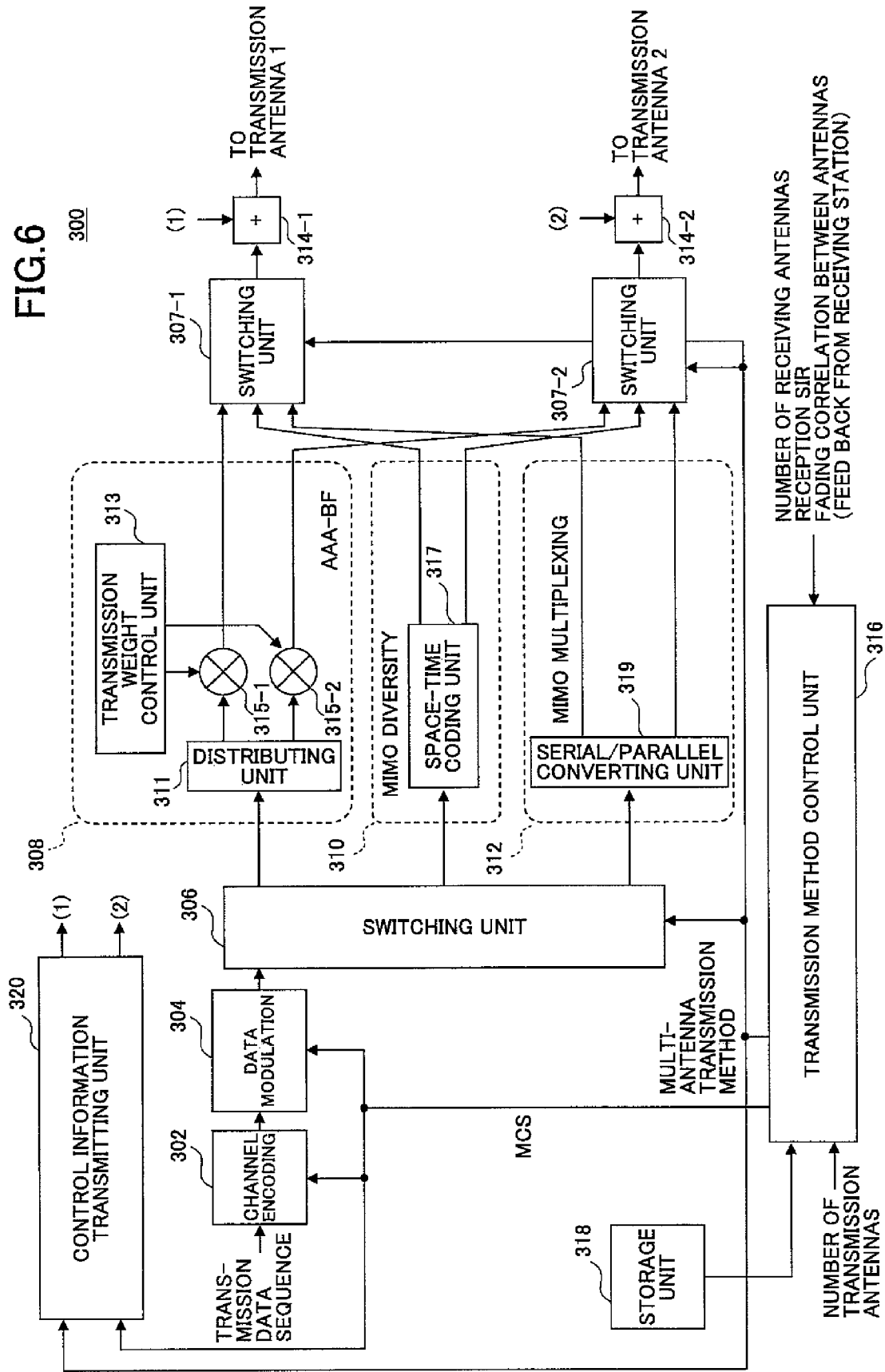

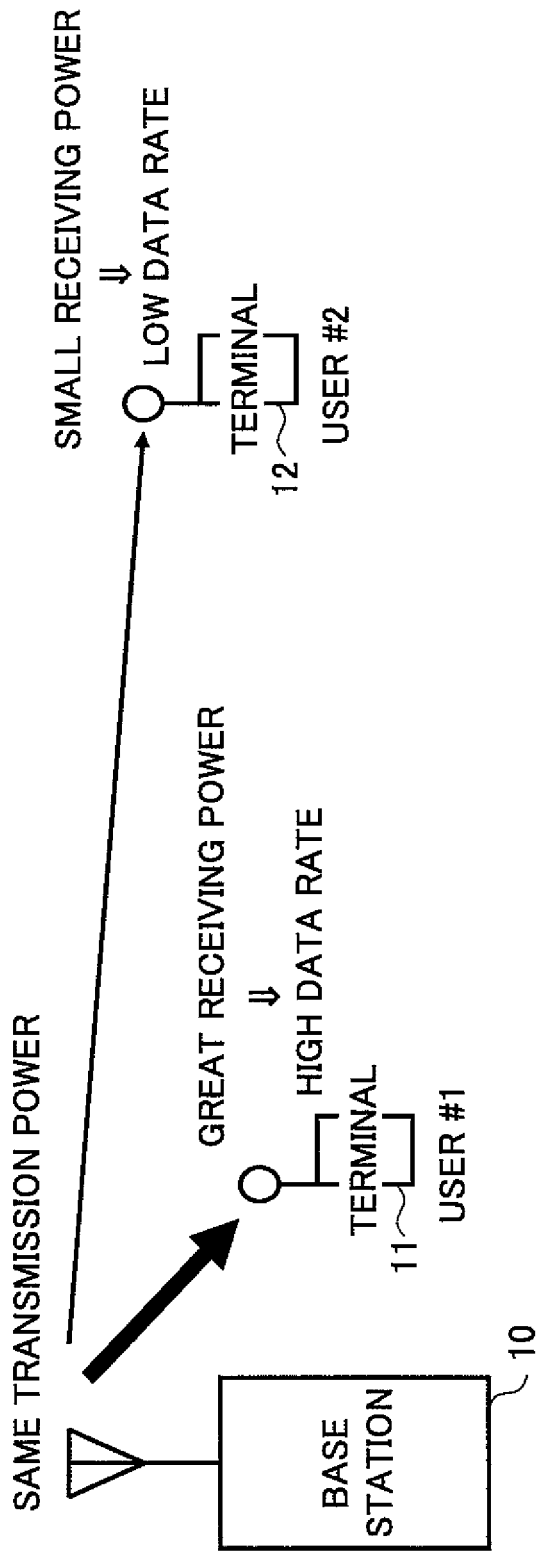

FIG.8
| MCS NUMBER | DATA MODULATION | CHANNEL ENCODING RATE | RELATIVE INFORMATION BIT RATE |
|---|---|---|---|
| MCS1 | QPSK | 1/3 | 1 |
| MCS2 | QPSK | 1/2 | 1.5 |
| MCS3 | QPSK | 2/3 | 2 |
| MCS4 | QPSK | 6/7 | 2.57 |
| MCS5 | 16QAM | 1/2 | 3 |
| MCS6 | 16QAM | 2/3 | 4 |
| MCS7 | 16QAM | 3/4 | 4.5 |
| MCS8 | 16QAM | 5/6 | 5 |
| MCS9 | 16QAM | 6/7 | 5.24 |
| MCS10 | 16QAM | 8/9 | 5.33 |
GREATER RECEPTION SIR ↓
FIG.9A
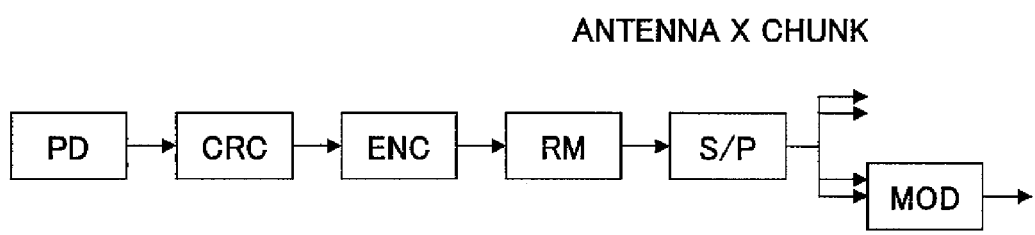
FIG.9B
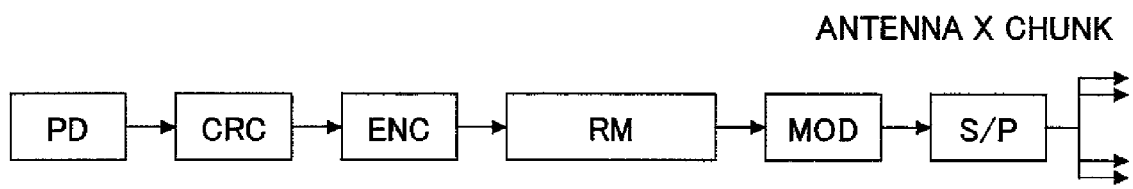

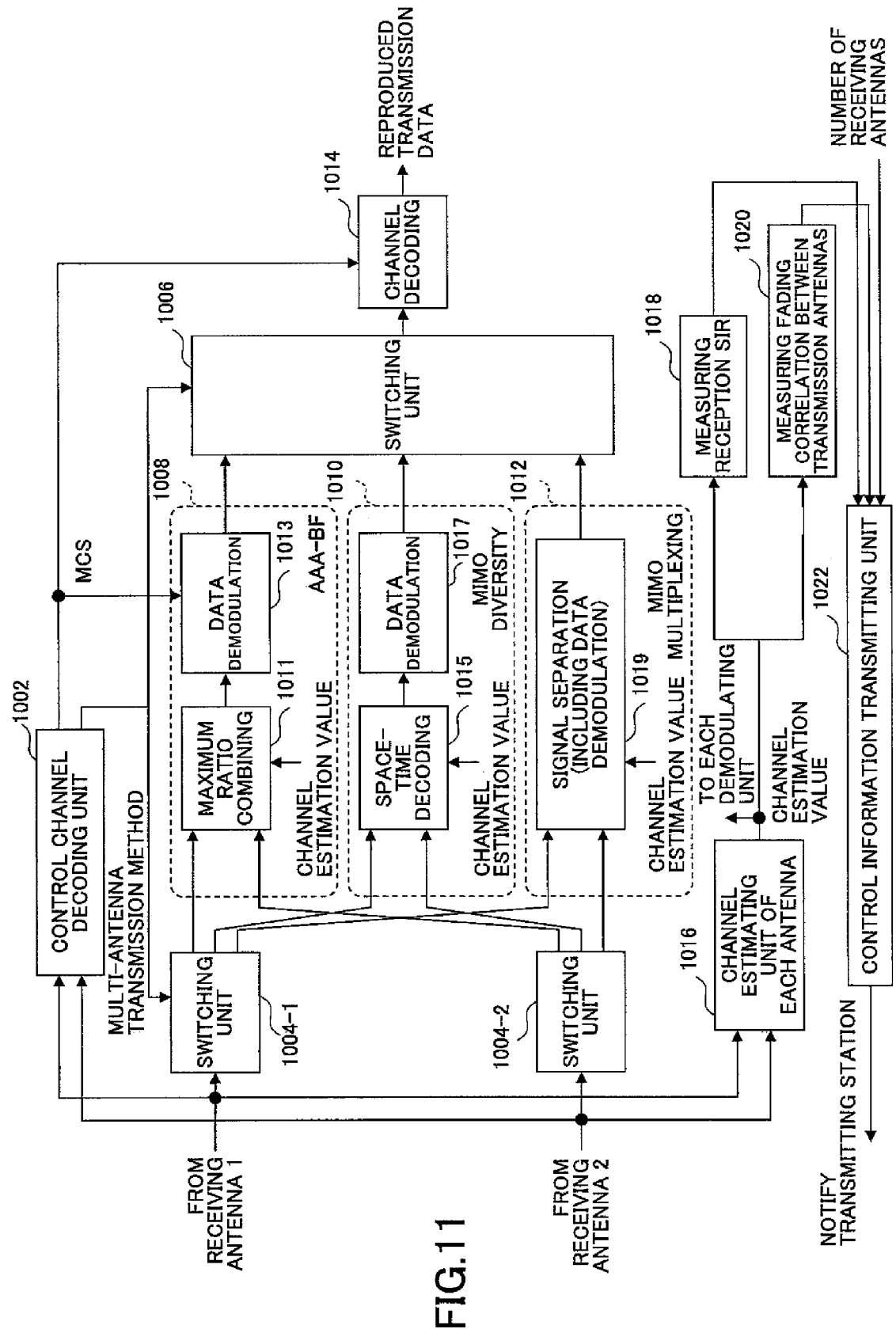

FIG.12

| | DESCRIPTION | SINGLE ANTENNA TRANSMISSION | MIMO (CONFIGURATION A) | MIMO (CONFIGURATION F) |
|---|---|---|---|---|
| UE IDENTITY | USER ID (NOT TRANSMITTED) | 0 | 0 | 0 |
| INFORMATION ABOUT FREQUENCY BLOCK ASSIGNMENT | INFORMATION ABOUT FREQUENCY BLOCK ASSIGNMENT | $N_{user} \times N_{chunk}$ | $N_{user} \times N_{chunk}$ | $N_{user} \times N_{chunk}$ |

$N_{chunk}$ : NUMBER OF FREQUENCY BLOCKS PER FRAME
$N_{user}$  : MAXIMUM NUMBER OF USERS MULTIPLEXED PER FRAME

FIG.13

| | EXAMPLE OF REQUIRED BIT LENGTH PER UNIT | COMMONLY TO TRANSMISSION ANTENNAS | INDEPENDENTLY OF TRANSMISSION ANTENNAS | FOR EACH TRANSMISSION ANTENNA GROUP |
|---|---|---|---|---|
| BIT FOR AMC | 10 TO 20 BITS | 1 UNIT / FRAME | $N_{ant}$ UNITS / FRAME | $N_{ant}$ UNITS / FRAME |
| BIT FOR HARQ | ABOUT 7 BITS | 1 UNIT / FRAME | $N_{ant}$ UNITS / FRAME | $N_{ant}$ UNITS / FRAME |
| BIT FOR SCHEDULING | ABOUT 10 BITS | 1 UNIT / FRAME | $N_{ant}$ UNITS / FRAME | $N_{ant}$ UNITS / FRAME |
| CQI FOR MIMO | ABOUT 7 BITS | 1 UNIT / FRAME | $N_{ant}$ UNITS / FRAME | $N_{ant}$ UNITS / FRAME |

$N_{ant}$ ← NUMBER OF TRANSMISSION ANTENNAS $N_{ant}$ ← NUMBER OF TRANSMISSION ANTENNA GROUPS

FIG.14

| | DESCRIPTION | SINGLE ANTENNA TRANSMISSION | MIMO (CONFIGURATION A) | MIMO (CONFIGURATION F) |
|---|---|---|---|---|
| INFORMATION ABOUT MODULATION SCHEME | DATA MODULATION (QPSK, 16QAM, 64QAM) | $2 \times N_{chunk}$ | $2 \times N_{chunk} \times N_{ant}$ | $2 \times N_{chunk} \times N_{ant}$ |
| INFORMATION ABOUT TRANSPORT BLOCK SIZE | INFORMATION ABOUT TRANSPORT BLOCK SIZE | $8 \times N_{chunk}$ | $8 \times N_{chunk}$ | $8 \times N_{chunk} \times N_{ant}$ |

$N_{ant}$: NUMBER OF TRANSMISSION ANTENNAS PER FRAME

FIG.15

| | DESCRIPTION | SINGLE ANTENNA TRANSMISSION | MIMO (CONFIGURATION A) | MIMO (CONFIGURATION F) |
|---|---|---|---|---|
| HYBRID-ARQ PROCESS INFORMATION | N CHANNEL STOP-AND-WAIT PROCESS NUMBER (RTT=6TTI)(3 BITS) | $3 \times N_{chunk}$ | $3 \times N_{chunk}$ | $3 \times N_{chunk} \times N_{ant}$ |
| REDUNDANCY VERSION AND CONSTELLATION PATTERN VERSION | CONSTELLATION PATTERN 4 TYPES × PUNCTURE PATTERN 4 TYPES. 8 USED OUT OF 16 KINDS (3 BITS) | $3 \times N_{chunk}$ | $3 \times N_{chunk}$ | $3 \times N_{chunk} \times N_{ant}$ |
| INFORMATION INDICATING WHETHER NEW DATA | WHETHER NEW OR RESENT PACKET IS INDICATED TO AVOID ERRONEOUS COMBINATION CONSIDERING ERROR OF ACK/NACK BIT | $N_{chunk}$ | $N_{chunk}$ | $N_{chunk} \times N_{ant}$ |

FIG.16B

| CHANNEL STATE | | |
|---|---|---|
| ANTENNA 1 | THIRD BEST | METHOD 1: FIXED GROUPING: FOR EXAMPLE: GROUP 1: ANTENNAS 1&2, GROUP 2: ANTENNAS 3&4. AVERAGE CQI OF GROUP 1 COMPARED WITH CQI OF GROUP 2. CQI OF 2 ANTENNAS OF A GROUP WHOSE CQI IS GREATER IS REPORTED. → NO NEED TO TRANSMIT GROUPING INFORMATION |
| ANTENNA 2 | FIRST BEST | |
| ANTENNA 3 | SECOND BEST | METHOD 2: ADAPTIVE GROUPING (ANTENNAS HAVING GOOD CHANNEL STATE, AND ANTENNAS HAVING POOR CHANNEL STATE ARE DIVIDED INTO GROUPS). → CQI OF N (<4) ANTENNAS REPORTED IN DESCENDING ORDER OF CHANNEL STATE |
| ANTENNA 4 | FOURTH BEST | |

FIG.16C

| CHANNEL STATE | | |
|---|---|---|
| ANTENNA 1 | THIRD BEST | METHOD 1 — FIXED GROUPING:<br>E.G.: GROUP 1: ANTENNAS 1&2, GROUP 2: ANTENNAS 3&4<br>AVERAGE CQI OF GROUP 1 COMPARED WITH CQI OF GROUP 2. CQI OF 2 ANTENNAS OF A GROUP WHOSE CQI IS GREATER IS REPORTED.<br>→NO NEED TO TRANSMIT GROUPING INFORMATION |
| ANTENNA 2 | FIRST BEST | |
| ANTENNA 3 | SECOND BEST | METHOD 2 — ANTENNAS HAVING GOOD CHANNEL STATE, AND ANTENNAS HAVING POOR CHANNEL STATE ARE DIVIDED INTO GROUPS.<br>EXAMPLES:<br>EX1: GROUP 1: ANTENNAS 2&3, GROUP 2: ANTENNAS 1&4<br>EX2: GROUP 1: ANTENNA 2, GROUP 2: ANTENNAS 1, 3, 4<br>EX3: GROUP 1: ANTENNAS 1, 2, 3, GROUP 2: ANTENNA 4<br>→TRANSMISSION QUALITY IS BETTER THAN METHOD 1 SINCE CHANNEL STATE IS CONSIDERED. |
| ANTENNA 4 | FOURTH BEST | |

| MCS NUMBER | DATA MODULATION | CHANNEL ENCODING RATE | |
|---|---|---|---|
| 1 | QPSK | 1/3 | |
| 2 | QPSK | 1/2 | |
| 3 | QPSK | 2/3 | |
| 4 | QPSK | 3/4 | |
| 5 | QPSK | 5/6 | |
| 6 | QPSK | 6/7 | ← ANTENNA 2 |
| 7 | 16QAM | 1/3 | |
| 8 | 16QAM | 1/2 | ← ANTENNA 1 |
| 9 | 16QAM | 2/3 | |
| 10 | 16QAM | 3/4 | ← ANTENNA 3 |
| 11 | 16QAM | 5/6 | ← ANTENNA 4 |
| 12 | 16QAM | 6/7 | |
| 13 | 64QAM | 3/4 | |
| 14 | 64QAM | 5/6 | |
| 15 | 64QAM | 6/7 | |
| 16 | 64QAM | 8/9 | |

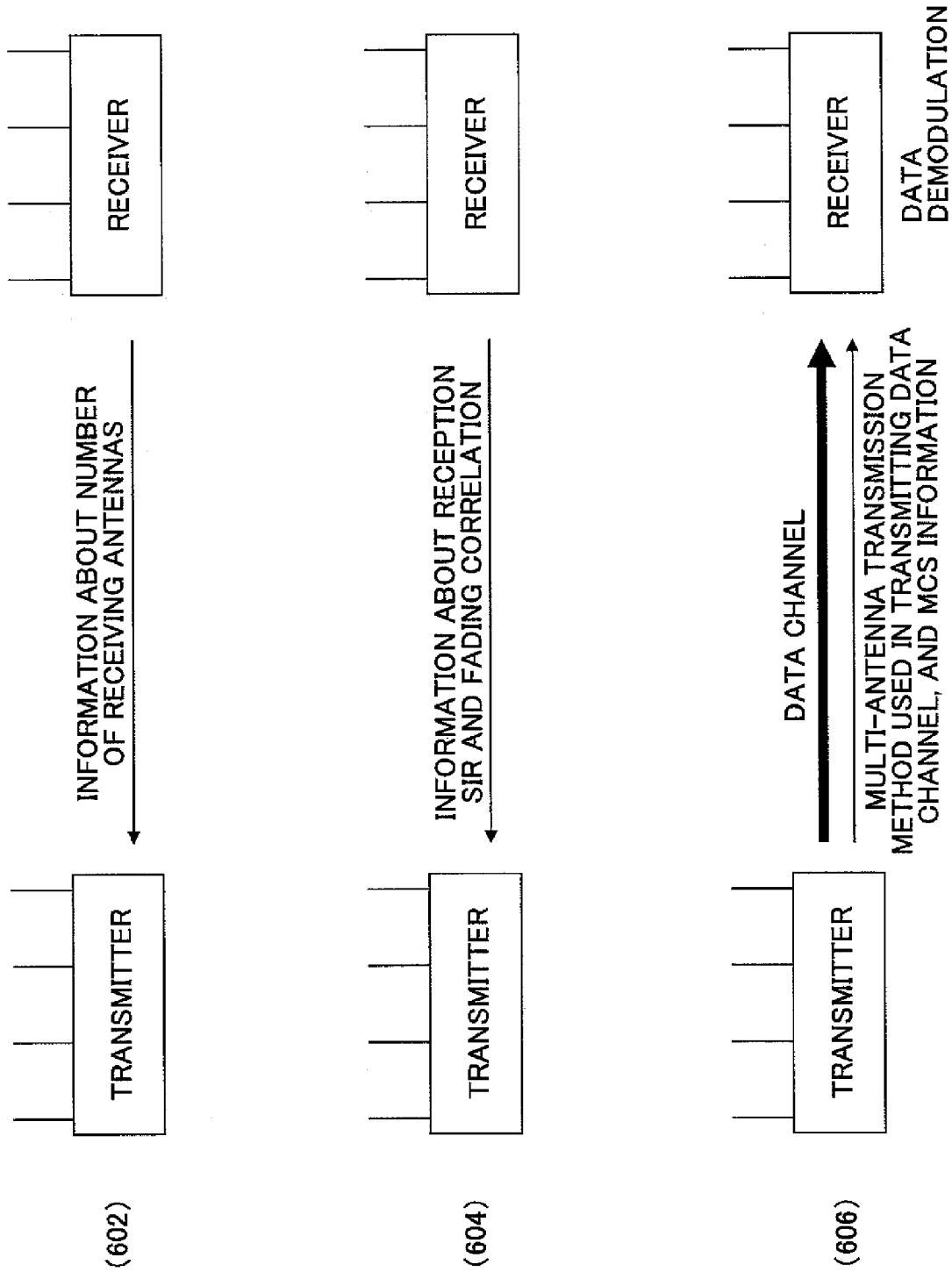

FIG.22
(WHEN FADING CORRELATION IS SMALL)
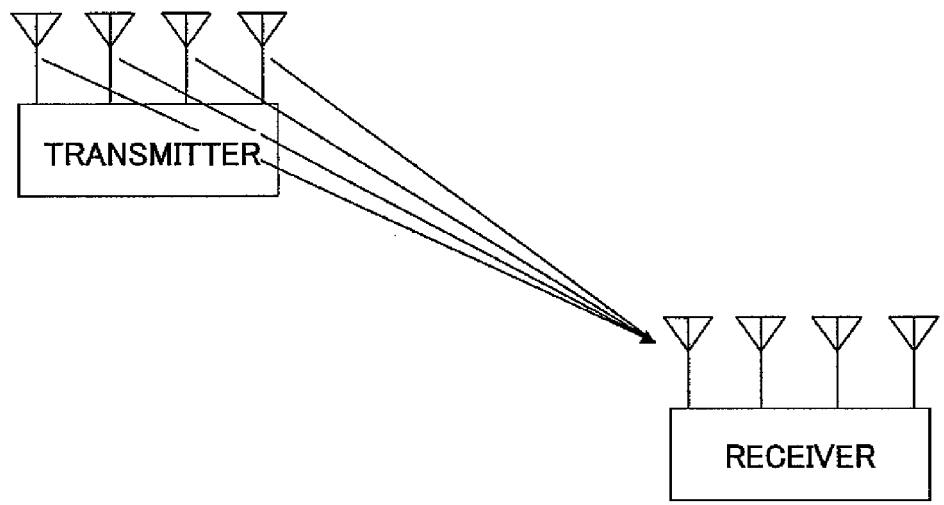
(WHEN FADING CORRELATION IS GREAT)
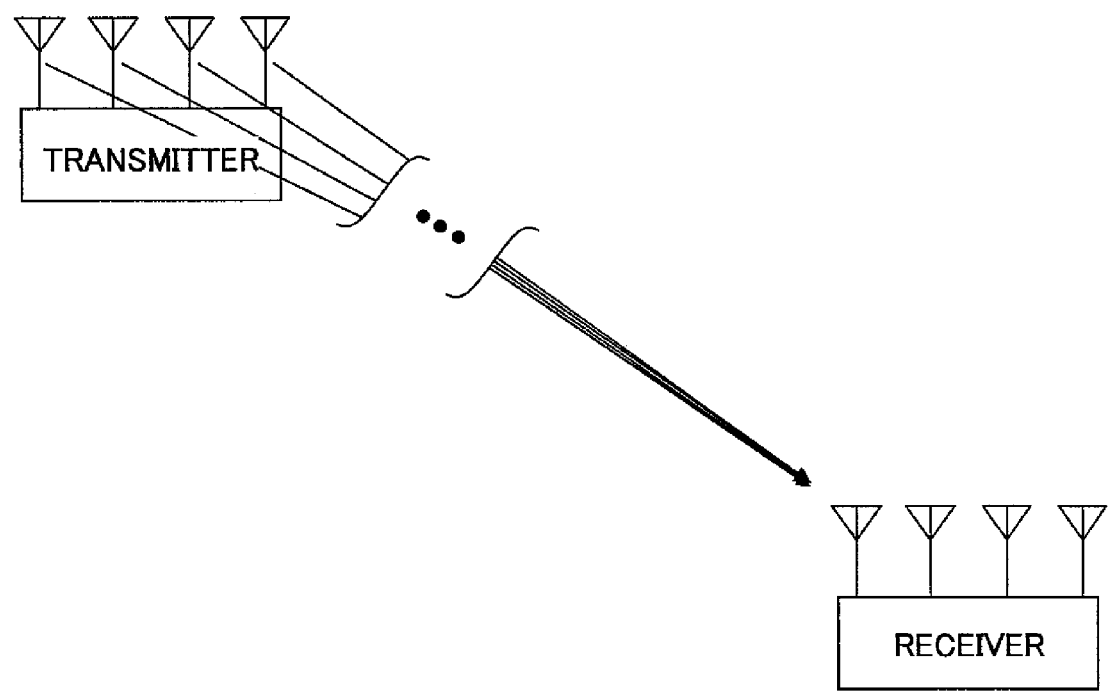

FIG.23

TABLE FOR MIMO MULTIPLEXING

| | SMALL←FADING CORRELATION→GREAT | | | | |
|---|---|---|---|---|---|
| GREAT←RECEPTION SIR→SMALL | MCS1 | MCS1 | ... | MCS1 | MCS1 |
| | MCS3 | MCS2 | ... | MCS1 | MCS1 |
| | ⋮ | ⋮ | ⋱ | ⋮ | ⋮ |
| | MCS10 | MCS8 | ... | MCS5 | MCS4 |

TABLE FOR MIMO DIVERSITY

| | SMALL←FADING CORRELATION→GREAT | | | | |
|---|---|---|---|---|---|
| GREAT←RECEPTION SIR→SMALL | MCS2 | MCS2 | ... | MCS2 | MCS2 |
| | MCS4 | MCS3 | ... | MCS2 | MCS2 |
| | ⋮ | ⋮ | ⋱ | ⋮ | ⋮ |
| | MCS11 | MCS9 | ... | MCS6 | MCS5 |

TABLE FOR AAA-BF

| | SMALL←FADING CORRELATION→GREAT | | | | |
|---|---|---|---|---|---|
| GREAT←RECEPTION SIR→SMALL | MCS2 | MCS2 | ... | MCS2 | MCS2 |
| | MCS2 | MCS2 | ... | MCS3 | MCS4 |
| | ⋮ | ⋮ | ⋱ | ⋮ | ⋮ |
| | MCS5 | MCS6 | ... | MCS9 | MCS11 |

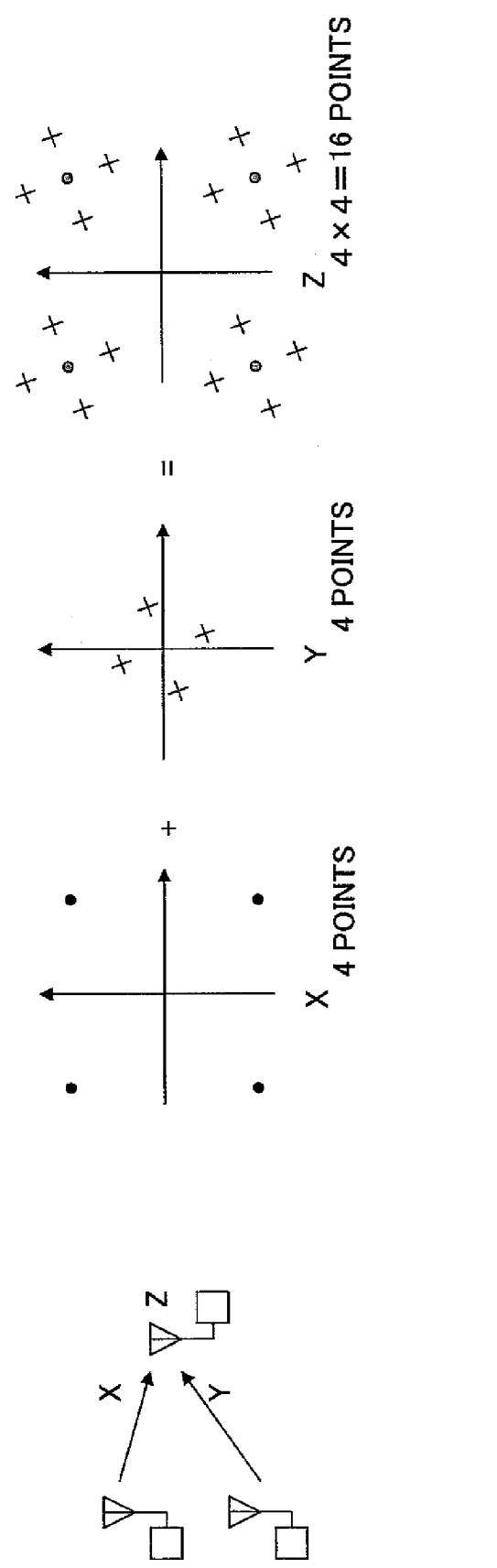

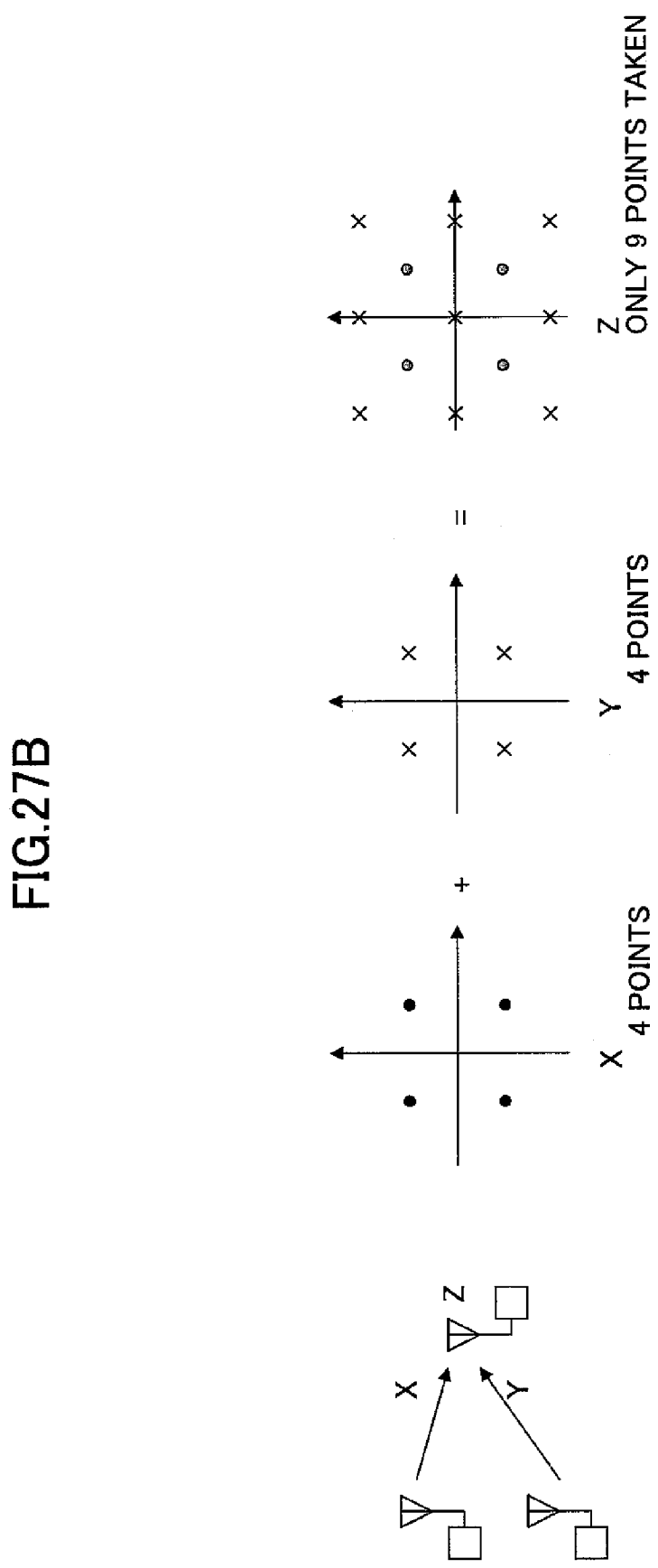

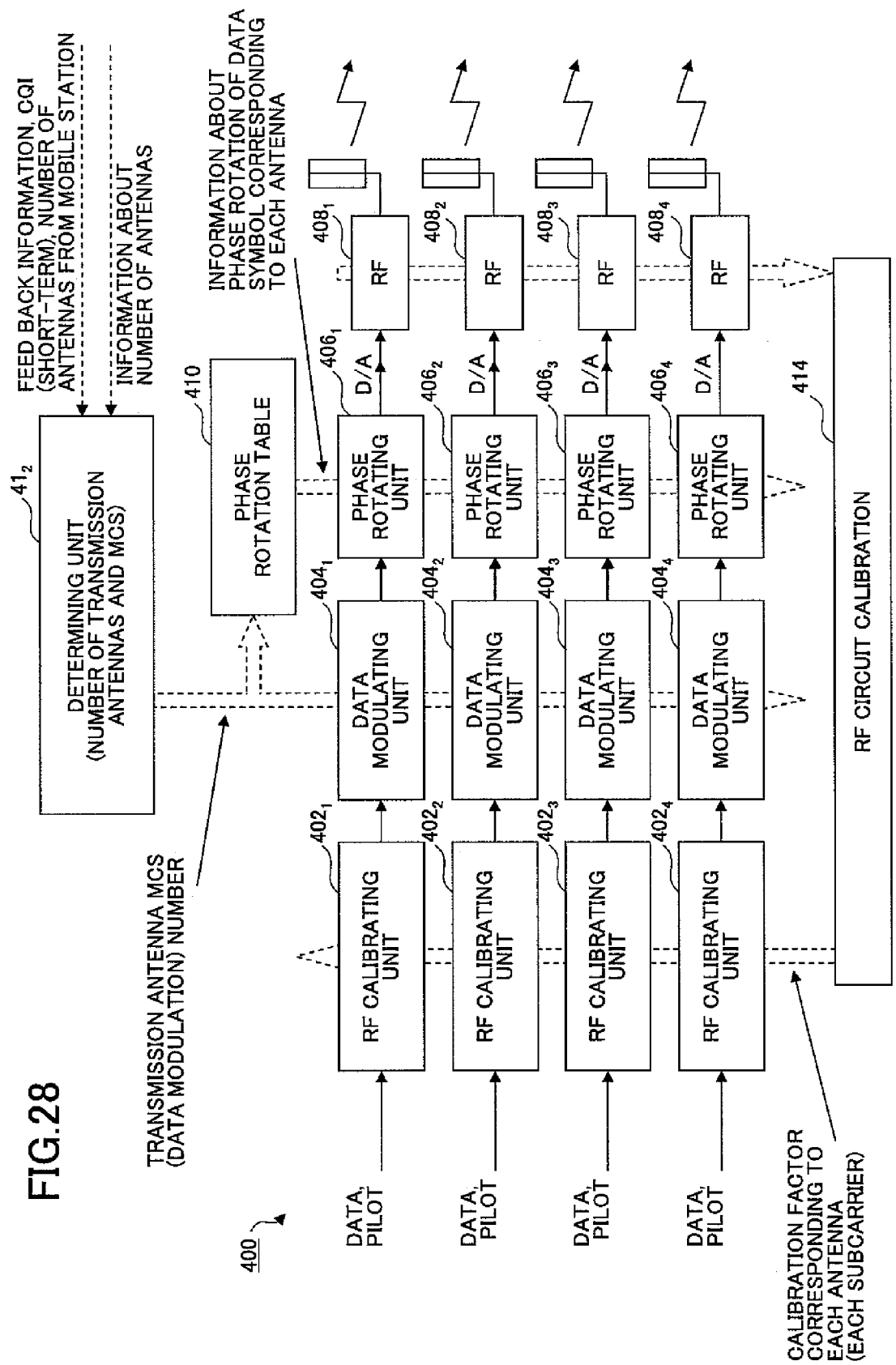

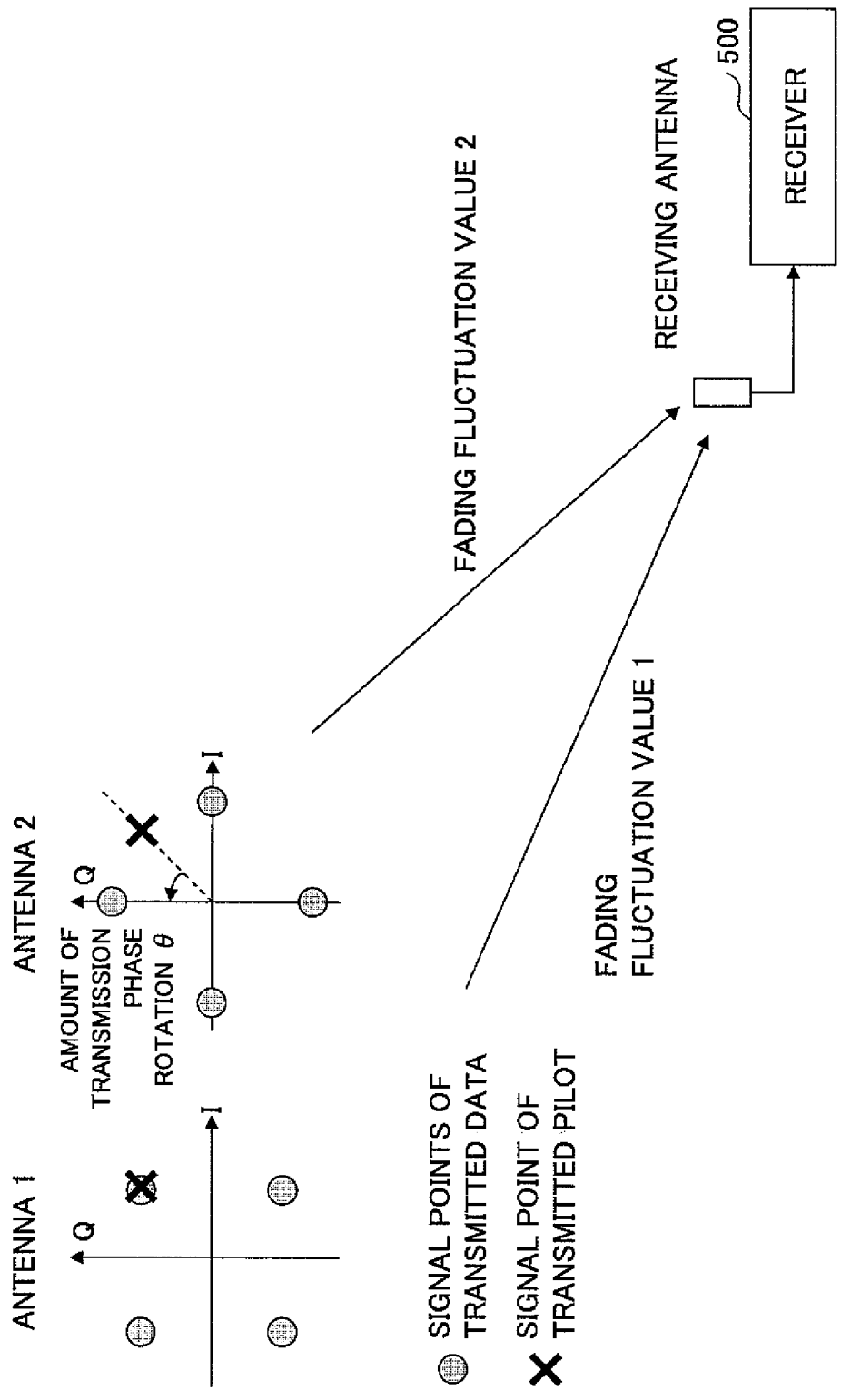

RADIO COMMUNICATION APPARATUS AND A RADIO COMMUNICATION METHOD

TECHNICAL FIELD

The present invention relates to a technical field of radio communication, and especially relates to a radio communication apparatus and a radio communication method that are used in a multi-antenna system.

BACKGROUND ART

In the technical field described above, multi-antenna systems and multi-antenna transmission methods have been proposed for future mobile communications systems from viewpoints of improvements in speed, quality, etc., of information transmission. According to the multi-antenna systems, data transmission is carried out using two or more antennas for transmission and/or reception, wherein not only frequency and time but also space is effectively utilized. The multi-antenna transmission methods generally include a MIMO (Multiple Input Multiple Output) multiplexing method, a MIMO diversity method, and an adaptive array antenna (AAA: Adaptive Array Antenna) method.

The concept of the MIMO multiplexing method is described with reference to FIG. 1A. The MIMO multiplexing method is a technique for increasing the amount of data transmission by a factor equal to the number of antennas that carry out simultaneous parallel transmission of different data from two or more transmission antennas. For simplicity, two antennas are used by each of a transmission side and a reception side. According to an example that is illustrated in FIG. 1A, separate symbol sequences (symbol sequence A, B, ..., and symbol sequence C, D ...) are transmitted from each antenna. Since the number of the transmission and receiving antennas is two, compared with the case where there is one, twice as great magnitude of data can be transmitted at once. A suitable signal separating method is performed on the reception side. As the signal separating method, a known method in the technical field concerned may be used, for example, a blasting (BLAST) method, a MMSE method, and a MLD method. In order to obtain a good quality data transmission by the MIMO multiplexing method, a relationship of $N_{TX} \leq N_{RX}$ must be sufficed between the number $N_{TX}$ of the transmission antennas and the number $N_{RX}$ of the receiving antennas. The MIMO multiplexing method is disclosed by, for example, Non Patent Reference 1.

The concept of the MIMO diversity method is described with reference to FIG. 1B. The MIMO diversity method is a technique for improving reliability on the reception side by transmitting two or more streams of the same contents in parallel from two or more transmission antennas. According to an example that is illustrated in FIG. 1B, when transmitting symbols A and B, one antenna transmits in a sequence of B and A, and another antenna transmits in a sequence of A* and −B*. Here, "−" is a negative sign, and "*" represents a complex conjugate. A technique of converting the symbols A and B to be transmitted into two streams such as above is called space-time block coding (STBC), or more simply, a linear process. On the reception side, B+A* and A−B* are received in this sequence, and the symbols A and B transmitted are deducted from the received signals. Since the two signals transmitted from the two antennas are subjected to separate fading, reliability of the received signals is improved by appropriately combining the two signals on the reception side. The MIMO diversity method is disclosed by Non Patent Reference 2, for example.

The concept of the adaptive array antenna method is described with reference to FIG. 1C. According to the adaptive array antenna method, two or more antennas are used, and the same number of copies of the same symbol sequence is produced for transmission, wherein each copy is multiplied by a corresponding transmission weight. By appropriately adjusting the transmission weights, a directional beam that has a main lobe directed to a communication partner is formed, and the communication quality on the receiving side can be raised.

Further, there are techniques of coping with a data error, one of which techniques is a hybrid ARQ (Automatic Repeat Request). This is a combination of a resending request for a packet when an error is detected with an error detection code (CRC: Cyclic Redundancy Check), and an error correction code by error correction coding (channel coding).

FIG. 2 shows a general process of the hybrid ARQ. On the transmission side, a CRC bit is attached (step S1), and error correction coding is performed (step S2). On the receiving side, error correction decoding is performed (step S3), and error detection using the CRC bit is performed (step S4). If an error is detected, a resending request is provided to the transmission side. If no error is detected, the transmission and the reception are completed.

Further, FIG. 3A, FIG. 3B, and FIG. 3C show types of the Hybrid ARQ process. According to the type shown in FIG. 3A, when a decoding error is present in a packet P1, the packet P1 is discarded, and a packet P2 containing the same contents is received for decoding again. According to the types shown in FIG. 3B and FIG. 3C, when a decoding error is present in the packet P1 the packet P1 is not discarded but held. Then, the packet P2 that is resent is combined with the packet P1 such that a packet P3 is generated, and the packet P3 is decoded. According to the type shown in FIG. 3B, the contents of the packet P2 are the same as the packet P1. By combining the packets, reception SIR is improved. According to the type shown in FIG. 3C, the resent packet is punctured with a different pattern. In this way, coding gain is improved by combining the packets.

Further, types of the MIMO multiplexing method are described with reference to FIG. 4A and FIG. 4B. According to the type shown in FIG. 4A, transmission antennas #1 and #2 transmit transmitting data (transmitting streams) #1 and #2, respectively. According to the type shown in FIG. 4B, the transmitting data (transmitting streams) #1 and #2 are weighted by $w_{1,1}$, $w_{1,2}$, $w_{2,1}$, and $w_{2,2}$, and provided to the transmission antennas #1 and #2, respectively, such that antenna beam patterns are formed corresponding to the transmitting data (transmitting stream) #1 and #2. The present invention is applicable to both types.

[Non Patent Reference 1] G. J. Foschini, Jr.: "Layered space-time architecture for wireless communication in a fading environment when using multi-element antennas", Bell Labs Tech. J., pp. 41-59, Autumn 1996

[Non Patent Reference 2] V. Tarokh, H. Jafarkhani, and R. Calderbank: "Space-Time Block Coding for Wireless Communications: Performance Results", IEEE J. Select. Areas Commun., Vol. 17, No. 3, pp. 451-460, March 1999

[Non Patent Reference 3] Paulraj et al., "Transmit Optimization for Spatial Multiplexing in Presence of Spatial Fading Correlation"

DISCLOSURE OF INVENTION

The inventor of the present invention, et al. compared throughputs of the MIMO multiplexing method and the MIMO diversity method as fundamental research for the present invention.

FIG. 5A shows simulation results. The simulation of the MIMO multiplexing method and the MIMO diversity method was conducted under conditions that a base station used two transmission antennas, data transmission was carried out at 90 Mbps, and a bandwidth of 100 MHz was used. Further, it was assumed that the number L of multipaths was 6, the maximum Doppler frequency fD was 20 Hz, and a delay distribution σ was 0.26 μs.

For the MIMO multiplexing method, a QPSK system was used, and an encoding rate was made into ⅓. That is, data of two different sequences were modulated by QPSK and encoded by R=⅓, and were separately transmitted from the two antennas. For the MIMO diversity method, the QPSK system was used, and the encoding rate was made into ⅔. In this case, data of two sequences of the same contents were modulated by the QPSK system and encoded by R=⅔, and were separately transmitted from the two antennas.

The horizontal axis of FIG. 5A represents average received power $E_b/N_0$ per antenna of a mobile station. Therefore, a small value on the horizontal axis represents a situation wherein received power was small, which can be related to an area that was distant from a base station. On the contrary, a great value on the horizontal axis represents a situation wherein the received power was great, which can be related to an area near the base station. The vertical axis of FIG. 5A represents the throughput (Mbps) that was attained at a point where the power as shown in the horizontal axis was measured. According to the present simulation, since the base station transmitted at 90 Mbps, the maximum throughput that could be attained was 90 Mbps.

According to the simulation results, if $E_b/N_0$ was the same, the MIMO diversity method provided a greater throughput than the MIMO multiplexing method. This indicates that the signal quality improvement with the MIMO diversity method was more effective than raising the throughput with the MIMO multiplexing method, where the information bit rate was small, and the number of modulation multiple values was small.

FIG. 5B shows simulation results of the same case as FIG. 5A except that the transmission rate of the base station was different. Here, the case of 290 Mbps and the case of 380 Mbps were compared as the transmission rates of the base station. In the case of 290 Mbps, for the MIMO multiplexing method, a 16QAM system was used, and the encoding rate was made into ½; and for the MIMO diversity method, a 64QAM system was used, and the encoding rate was made into ⅔. In the case of 380 Mbps, for the MIMO multiplexing method, a 16QAM system was used, and the encoding rate was made into ⅔; and for the MIMO diversity method, a 64QAM system was used, and the encoding rate was made into ⅚. In order to attain a high bit rate such as 290 Mbps and 380 Mbps by the MIMO diversity method, it is necessary to comparatively enlarge the modulation multiple value and increase the encoding rate.

According to the simulation results, the MIMO multiplexing method can attain a greater throughput than the MIMO diversity method. This is because accuracy of estimation of the MIMO diversity method is degraded due to complications in distinction of a Euclid distance between symbols on a symbol constellation compared with the MIMO multiplexing method, which is mainly due to an increase of the modulation multiple values and the encoding rate, and a decrease of encoding gain (i.e., redundancy is decreased). Differences in throughput that can be obtained with the same received power are greater with case of 380 Mbps than the case of 290 Mbps, i.e., the greater the differences are, the greater the bit rate transmitted from the base station becomes.

As described above, the multi-antenna transmission methods proposed may not necessarily be optimal depending on communication environments and user requirements. Although the comparison was made between the MIMO multiplexing method and the MIMO diversity method as shown in FIG. 5A and FIG. 5B, respectively, the adaptive array antenna method may become less than optimal depending on the communication environments.

The objective of the present invention is to provide a radio communication apparatus and a radio communication method, whereby the throughput of the data transmission is improved in a multi-antenna system.

Means for Solving the Problem

In the present invention, a radio communication apparatus that includes two or more antennas is used. The radio communication apparatus includes a receiving unit for receiving a notice signal from a communication partner, two or more units for changing the number of data sequences according to each of two or more transmission methods of the MIMO multiplexing method, the MIMO diversity method, and the adaptive array antenna method, and for connecting to the two or more antennas, and a selecting unit for selecting at least one of the units out of the two or more units based on the notice signal, and a transmitting unit for reporting a transmission method corresponding to the selecting unit to the communication partner.

Advantage of Invention

According to the embodiments of the present invention, the throughput of the data transmission in a multi-antenna system can be raised.

BRIEF DESCRIPTION OF DRAWINGS

FIG. 6 is a block diagram of a transmitter according to an embodiment of the present invention.

FIG. 7 is a schematic drawing showing the concept of an AMC method.

FIG. 8 is a table showing an example of combinations of a modulation method and an encoding rate.

FIG. 9A is a block diagram showing a part of the transmitter of the MIMO multiplexing method.

FIG. 9B is a block diagram showing a part of the transmitter of the MIMO multiplexing method.

FIG. 11 is a block diagram of a receiving unit according to an embodiment of the present invention.

FIG. 12 is a table showing the configuration of a control bit of a downlink common control channel.

FIG. 13 is a table showing the configuration of the control bit in the MIMO transmission.

FIG. 14 is a table showing the configuration of the control bit of the downlink common control channel.

FIG. 15 is a table showing the configuration of the control bit of the downlink common control channel.

FIG. 16B is a chart for explaining the AMC and CQI bit number reduction.

FIG. 16C is a chart for explaining the AMC and CQI bit number reduction.

FIG. 20 is a schematic diagram showing the outline of a method according to an embodiment of the present invention.

FIG. 22 is a schematic diagram showing switching of multi-antenna transmission methods, depending on the magnitude of fading correlation.

FIG. 23 is a table showing a typical MCS table prepared for each of the multi-antenna transmission methods.

FIG. 27A is a schematic diagram showing a MIMO multiplex reception process.

FIG. 27B is a schematic diagram showing a MIMO multiplex reception process.

FIG. 28 is a block diagram of a transmission apparatus for performing adaptive transmission phase control of the MIMO multiplexing method.

FIG. 30 is a schematic diagram showing channel estimation value compensation performed by the receiving unit.

LIST OF REFERENCE NUMERALS

Figure 1A:
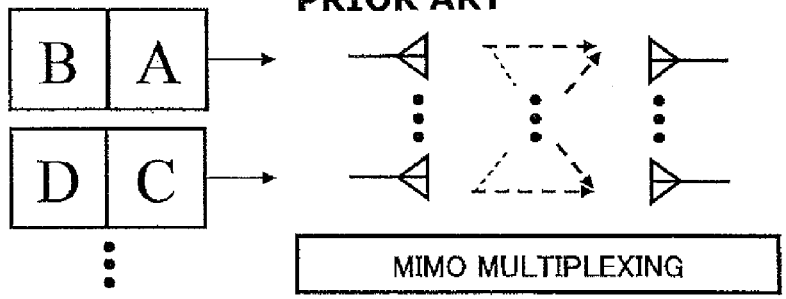
FIG. 1A is a schematic drawing for describing a MIMO multiplexing method.

10 Base Station; 11, 12 Terminal;
300 Transmitter; 302 Channel coding unit; 304 Data modulating unit; 306, 307-1, 2 Switching unit; 308 Beam forming unit (AAA-BF); 310 MIMO diversity unit; 311 distributing unit; 312 MIMO multiplexing unit; 313 Transmission weight control unit; 314-1, 2 Combining unit; 315-1, 2 Multiplying unit; 316 Transmission method control unit; 317 Space-time coding unit; 318 Storage unit; 319 Serial/parallel converting unit; 320 Control information transmitting unit;
702 Data modulating unit; 704 Serial/parallel converting unit; 706-1, 2 Space-time coding unit; 711, 712, 721, 722 Transmission antenna;
1000 Receiver; 1002 Control channel demodulating unit; 1004-1, 2, and 1006 Switching unit; 1008 Receiving unit for beam forming; 1010 Receiving unit of the MIMO diversity method; 1011 Maximum ratio combining unit; 1012 Receiving unit for the MIMO multiplexing method; 1013, 1017 Data modulating unit; 1015 Space-time coding unit; 1014 Channel decoding unit; 1016 Channel estimating unit; 1018 Receiving quality measuring unit; 1019 Signal separating unit; 1020 Fading correlation measuring unit; 1022 Control information transmitting unit

BEST MODE FOR CARRYING OUT THE INVENTION

According to an embodiment of the present invention, one of multi-antenna transmission methods is selected based on a notice signal received from a communication partner, and the selected transmission method is reported to the communication partner. Since a suitable multi-antenna transmission method is selected according to a communication situation to/from the communication partner, throughput can be raised compared with the system that does not switch the transmission methods. In other words, a service area that can provide throughput equal to or greater than a predetermined value can be expected. The multi-antenna transmission methods are at least two out of a MIMO multiplexing method, a MIMO diversity method, and an adaptive array antenna method. Further, the multi-antenna transmission methods may include any combination(s) of the MIMO multiplexing method, the MIMO diversity method, and the adaptive array antenna method.

The notice signal may contain a received signal quality (for example, SIR) on the side of the communication partner. The notice signal may contain information on the number of antennas used by the communication partner, if required. The received signal quality may be measured by either one of the communication partner and the communication apparatus concerned. By the multi-antenna transmission methods, the number of antennas that can be used for transmission and reception has limitations. For example, if the reception side has a smaller number of antennas than the transmission side, the received signal quality is remarkably degraded. According to the embodiment of the present invention, information such as the received signal quality and the number of antennas is reported to the transmitter from the receiver (communication partner), and a suitable multi-antenna transmission method is employed. In this way, degradation of the signal quality resulting from a difference in the number of antennas can be avoided or effectively mitigated.

The notice signal may also contain information about a degree of similarity of fading that influences two or more radio propagation paths corresponding to the two or more antennas. The degree of the similarity of fading may be estimated by a correlation value of a signal received with a certain antenna with the signal received with another antenna. By determining the degree of the similarity of the radio propagation paths, whether the adaptive array antenna method should be used can be appropriately determined.

A radio communication apparatus may include a storage unit for storing a table that defines corresponding relationships between the similarity of fading of the radio propagation paths, the received signal quality, a modulation method, and an encoding rate. The table may be prepared for each of the multi-antenna transmission methods. The transmission method may be selected by selecting a combination that gives the greatest bit rate out of the combinations of the modulation methods and the encoding rates in the table. In this method, a transmission method that raises the throughput can be simply selected.

According to an embodiment of the present invention, the multi-antenna transmission method used for data transmission is specified by the side transmitting the data. In this case, the radio transmission apparatus includes a receiving unit for receiving the notice signal from the communication partner, two or more units for converting a data sequence to be transmitted into two or more data sequences according to each of two or more transmission methods out of the MIMO multiplexing method, the MIMO diversity method, and the adaptive array antenna methods, which units are connected to two or more antennas, a selecting unit for selecting at least one of the two or more units for converting based on the notice signal, and a transmitting unit for notifying the communication partner of the transmission method of the selected unit.

According to an embodiment of the present invention, the multi-antenna transmission method used by data transmission is specified by the receiving side that receives the data. In this case, the radio receiving unit includes a converting unit that includes two or more units for converting two or more data sequences received with the two or more antennas into one data sequence. The two or more units are provided corresponding to the two or more transmission methods out of the MIMO multiplexing method, the MIMO diversity method, and the adaptive array antenna method. Further, the radio receiving unit includes a selecting unit for selecting at least one from the two or more units based on the information reported by the communication partner, and a transmitting unit for notifying the communication partner of the transmission method corresponding to the selected unit.

Hereafter, the embodiment of the present invention is described using words "transmitter" and "receiver"; however, the words are only for convenience. According to the intention of the present patent application, the transmitter not only transmits a signal, but can receive a signal if needed; and the receiver not only receives a signal, but can transmit a signal if needed.

Embodiment 1

FIG. 6 is a block diagram of a transmitter according to an embodiment of the present invention. Although a transmitter 300 is typically installed in a base station, it may be installed in another apparatus. Although the transmitter includes two transmission antennas, for example, the number of the transmission antennas may be appropriately chosen. The transmitter 300 includes a channel coding unit 302, a data modulating unit 304, switching units 306, 307-1, and 2, a beam forming unit (AAA-BF) 308, a MIMO diversity unit 310, a MIMO multiplexing unit 312, combining units 314-1, and 2, a transmission method control unit 316, a storage unit 318, and a control information transmitting unit 320.

The channel coding unit 302 is for encoding a transmitting data sequence according to a suitable encoding algorithm. The channel coding unit 302 consists of, for example, a turbo encoder. An encoding rate is determined by the transmission method control unit 316.

The data modulating unit 304 is for modulating the data sequences. Modulation methods include BPSK, QPSK, 16QAM, and 64QAM. A modulation method is selected by the transmission method control unit 316.

The switching unit 306 provides the modulated signal to the beam forming unit 308, the MIMO diversity unit 310, and the MIMO multiplexing unit 312 according to directions from the transmission method control 316. The switching units 307-1 and 2 provide outputs of the beam forming unit 308, the MIMO diversity unit 310, and the MIMO multiplexing unit 312 to the combining units 314-1 and 2, respectively, for corresponding transmission antennas according to directions from the transmission method control unit 316.

The beam forming unit (AAA-BE) 308 includes a distributing unit 311, a transmission weight control unit 313, and multiplying units 315-1 and 2. The distributing unit 311 is for distributing or reproducing the data sequence input there into two or more sequences. Since the number of distributions is equal to the number of transmission antennas, which is 2 according to the present example, the number of the distributions is 2. The transmission weight control unit 313 is for generating and providing transmission weights for realizing a directional beam such that antenna gain may become the greatest toward the communication partner. The multiplying units 315-1 and 2 are for multiplying the transmission weights and the data sequences output from the distributing unit 311, and for outputting products. The transmission weights can be computed using a suitable known adaptive algorithm.

The MIMO diversity unit 310 includes a space-time coding unit 317. The space-time coding unit 317 is for determining and outputting two or more data sequences from a data sequence input there according to the number of transmission antennas. Two data sequences are output in the present example. The space-time coding unit 310 carries out space-time block coding (STBC). Although the contents of symbols in two or more data sequences are different if they are compared in each transmitting time interval (TTI), they are substantially the same if they are compared in each predetermined period. For example, in the example shown in FIG. 1B, symbols B and A are transmitted in this sequence from a transmission antenna, and symbols A* and −B* are transmitted in this sequence from the other antenna. Therefore, if comparison is made for each TTI, each antenna outputs a different symbol; however, if the contents included in 2TTI are compared, only the information about the symbols A and B are contained. Such space-time coding or linear processing is performed by the space-time coding unit 317.

Figure 1B:
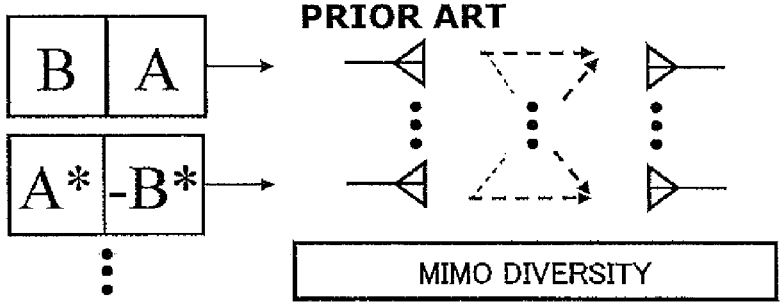
FIG. 1B is a schematic drawing for describing a MIMO diversity method.
Figure 1C:
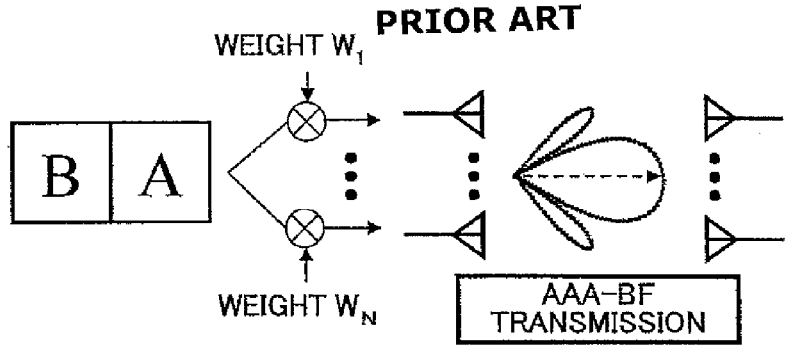
FIG. 1C is a schematic drawing for describing an adaptive array antenna method.
Figure 2:
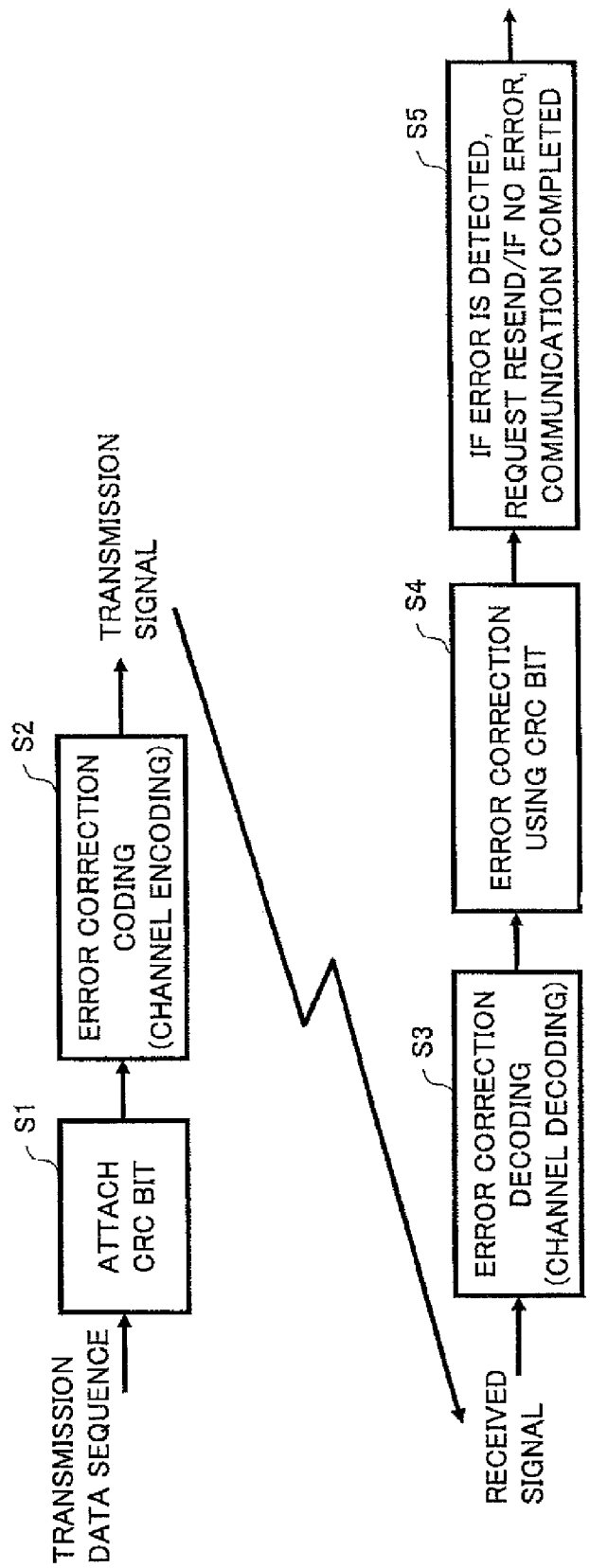
FIG. 2 is a flowchart of a general hybrid ARQ process.
Figure 3A:
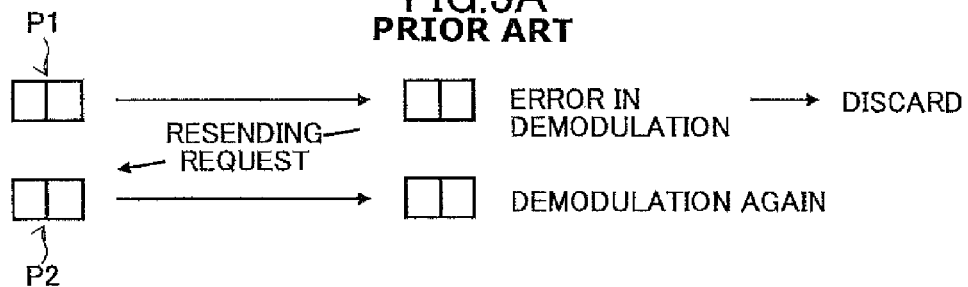
FIG. 3A is a schematic drawing for describing a type of the Hybrid ARQ process.
Figure 3B:
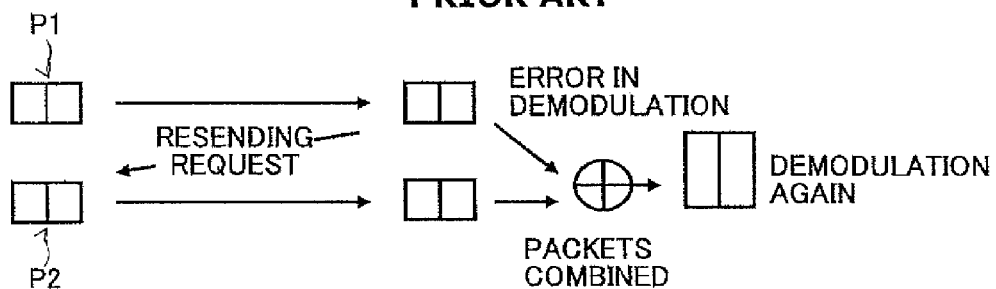
FIG. 3B is a schematic drawing for describing another type of the Hybrid ARQ process.
Figure 3C:
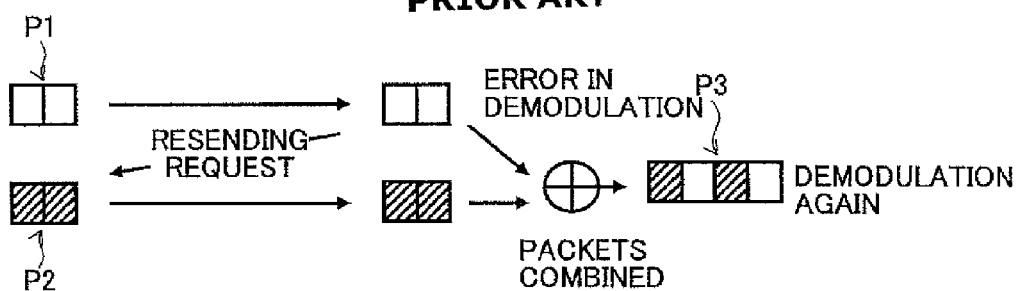
FIG. 3C is a schematic drawing for describing another type of the Hybrid ARQ process.

The MIMO multiplexing unit 312 includes a serial/parallel converting unit 319. The serial/parallel converting unit 319 is for, determining and outputting two or more data sequences from a data sequence provided there according to the number of the transmission antennas. For example, if a symbol sequence consisting of A, B, C, and D is input as shown in FIG. 1A, a data sequence of A and B, and a data sequence of C and D are output.

The combining units 314-1 and 2 combine a control signal and the signal transmitted from the transmission antenna, if needed. Combining may be performed by one or more of time multiplexing, frequency multiplexing, and code multiplexing.

The transmission method control unit 316 is for determining a transmission method based on the number $N_{TX}$ of the transmission antennas, the number $N_{RX}$ of the receiving antennas, reception SIR, and a fading correlation value. Contents that are determined include the modulation method and the encoding rate that are to be used for transmission. Further, the contents that are determined include a transmission method that is to be used by the transmitter 300; namely, the adaptive array antenna method, the MIMO diversity method, or the MIMO multiplexing method. Reception SIR is an example of the received signal quality measured by the communication partner (typically a mobile station). Not only SIR, but other suitable channel state information (CQI: Channel Quality Indicator) may be used. The fading correlation value is a correlation value of fading received through a radio propagation path about a certain transmission antenna and fading received on a radio propagation path about another transmission antenna. The fading correlation value expresses the degree of similarity of the radio propagation paths about the transmission antennas.

The control information transmitting unit 320 is for generating a signal transmitted on the control channel. The control channel contains information about contents determined by the transmission method control unit 316 in addition to a general information channel containing information for identifying the base station and others. In this information, information for specifying a multi-antenna transmission method, and information for specifying a modulation method and an encoding rate are included. The control channel may be transmitted from two or more transmission antennas, or may be transmitted from only one transmission antenna. The control channel may be transmitted with a directional beam by beam forming, or after space-time encoding. However, since the control channel must communicate with communication partners (mobile stations) in various environments, it is desirable that a fixed transmission method be used.

The storage unit 318 is for storing a MCS table. That is, according to this embodiment, adaptive modulation and coding (AMC) is adopted, and a modulation method and an encoding rate are adjusted one by one. A general description about AMC is presented below with reference to FIGS. 7, and 8. The MCS table according to this embodiment includes not only combinations of reception SIR, modulation method, and encoding rate, but also corresponding relationships between each combination and a fading correlation value. At least three MCS tables are prepared according to this embodiment. The MCS tables are related to the transmission methods, namely, the beam forming method, the MIMO diversity method, and the MIMO multiplexing method. If a combination of the transmission methods is made available for selection by the transmission method control unit 316, a MCS table for such a combination is prepared. For example, if data transmission is performed by a combination of the MIMO multiplexing method and the MIMO diversity method, a MCS table for this combination is prepared in addition to the MCS tables for the three transmission methods. As a result, four MCS tables are stored in the storage unit 318.

The concept of adaptive modulation coding (AMC) generally practiced is described with reference to FIG. 7. Under a premise that the transmission power of a base station 10 is fixed, a terminal 11 near the base station 10 can receive a signal with greater power than a terminal 12 far from the base station 10. Accordingly, it is presumed that the channel state of the terminal 11 is good; for this reason, great values are assigned as the modulation multiple value, and as the encoding rate. On the other hand, the terminal 12 can receive the signal with less power than the terminal 11. Accordingly, it is presumed that the channel state of the terminal 12 is poor; for this reason, small values are assigned as the modulation multiple value, and as the encoding rate.

FIG. 8 shows an example of combinations of a modulation method (a modulation multiple value) and a channel coding rate. The right-hand most column shows a relative bit rate when the bit rate, in the case where the modulation method M is QPSK, and the rate R of channel coding is ⅓, equals 1. For example, if M=QPSK (2 bits/symbol), and R=½, 1.5 times as great bit rate can be obtained; and if M=16QAM (4 bits/symbol), and R=½, 3 times as great bit rate can be obtained. Generally, reliability tends to be degraded as the bit rate becomes great. In the present example, a MCS number is assigned, wherein the bit rate increases as the MCS number increases. Actually, combinations of an amount showing a channel state, a modulation method, and an encoding rate are beforehand defined in the table, and a modulation method, etc., are suitably changed according to the channel state. If the reception SIR is great, a combination associated with a great MCS number is used.

Next, the configuration of the transmitter in the case of the MIMO multiplexing method is described. That is, a specific configuration is described about the channel coding unit 302, the data modulating unit 304, and the MIMO multiplexing unit 312 described with reference to FIG. 6.

Although the case wherein a transmitter 300 includes two antennas is described here, the same is said about the case with two or more antennas. Further, although the case wherein an assigned frequency bandwidth is divided into two frequency blocks is described here, the same is said of the case wherein the frequency bandwidth is divided into two or more frequency blocks.

With reference to FIGS. 9A through 9D,

PD is packet data, i.e., layer 2 PDU (L2PDU: Layer 2 Protocol Data Unit), and represents one block of data to be sent.

CRC is a CRC unit for adding an error detection code for performing channel coding.

ENC is an encoding unit for encoding by, for example, a turbo code and a convolutional code.

RM is a rate matching unit for changing the encoding rate. For example, RM extracts a part of encoded bits such that the encoding rate is made greater (puncturing); or, the encoding rate is lowered by copying some encoded bits, and repeatedly transmitting (repetition). Further, RM performs an H-ARQ process.

MOD is a data modulating unit for modulating data. MOD performs modulation by using, for example, QPSK, 16QAM, and 64QAM according to a propagation state. Further, MOD carries out a spreading process and a scrambling process. S/P is a serial/parallel converter for performing a serial/parallel conversion.

First, the case wherein an antenna and a frequency block are not distinguished is described.

In this case, the transmitter is configured such that an adaptive modulation/demodulation process, as shown in FIG. 9A, may be independently performed for each antenna (in the following, this is called antenna independent AMC), and a HARQ process may be performed commonly for the antennas (this is called antenna common HARQ). This configuration is called Configuration A. According to the antenna independent AMC, a common encoding rate is used.

Specifically, the transmitter includes a CRC unit into which PD is input, ENC that is connected to the CRC unit, RM connected to ENC, S/P connected to RM, and MOD into which a signal that is serial/parallel converted by S/P is input for each antenna.

According to the transmitter, the CRC unit adds CRC to transmitting data, ENC performs channel encoding, RM changes the encoding rate as determined by AMC, S/P divides a signal into 4 signals (here, "4" is equal to the number of antennas×the number of frequency blocks), MOD maps the signals divided by S/P with the modulation method determined by AMC corresponding to each antenna, and the signals are transmitted at corresponding frequency blocks and antennas. According to the transmitter, since data modulation is performed after S/P conversion, AMC can be independently performed for the antennas and HARQ is performed in common. However, since RM is placed before S/P, the encoding rate cannot be changed in AMC.

Since the AMC process is performed for each antenna, the AMC process can be performed based on a level difference, for example, a difference of received power between the antennas in an actual implementation so that a good data channel characteristic is acquired. Further, when a coding unit goes beyond an antenna, a good data channel characteristic is acquired by performing rate control for each antenna only in the modulation as described above. When transmitting channel coded data from two or more antennas by frequency blocks, a better characteristic can be obtained by changing the modulation method, rather than changing the encoding rate.

Further, the HARQ process is commonly performed for the antennas, and a good data channel characteristic is acquired by the diversity.

Further, the transmitter may be configured as shown in FIG. 9B (the configuration is called Configuration B) such that the adaptive modulation/demodulation process may be performed in common for each antenna (this is called antenna-common AMC), and the antenna common HARQ may be performed.

Specifically, the transmitter includes the CRC unit into which PD is input, ENC that is connected to the CRC unit, RM that is connected to ENC, MOD connected to RM, and S/P connected to MOD.

In this transmitter, CRC is attached by the CRC unit, channel encoding is performed by ENC, the encoding rate of transmitting data is adjusted to a rate determined by AMC, mapping is performed by MOD according to the modulation method determined by AMC, the signal is divided into 4 branches (here, "4" is equal to the number of antennas×the number of frequency blocks), and the divided signals are transmitted from the corresponding frequency blocks and antennas. According to this transmitter, the same modulation method and the encoding rate are applied to the antennas.

Figure 9C:
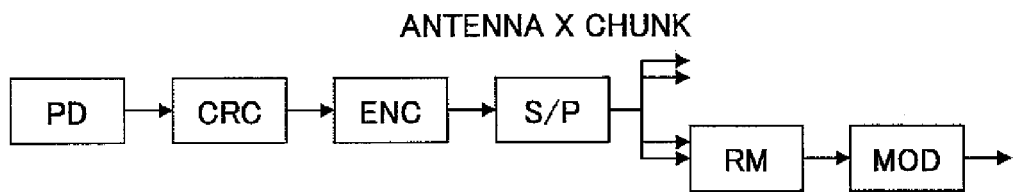
FIG. 9C is a block diagram showing a part of the transmitter of the MIMO multiplexing method.

Further, the transmitter may be configured as shown in FIG. 9C (Configuration C) such that the adaptive modulation/demodulation process may be independently performed for each antenna (this is called antenna independent AMC), and antenna common HARQ may be performed.

Specifically, the transmitter includes the CRC unit into which PD is input, ENC that is connected to the CRC unit, S/P that is connected to ENC, S/P connected to ENC, RM into which the signal that is serial/parallel converted by S/P for each antenna is input, and MOD connected to S/P. The signal is divided into 4 branches by S/P, where "4" is equal to the number of antennas×the number of frequency blocks. According to this transmitter, rate matching and data modulation are performed after S/P conversion; accordingly, HARQ is performed in common for the antennas, and AMC is independently performed for the antennas.

Figure 9D:
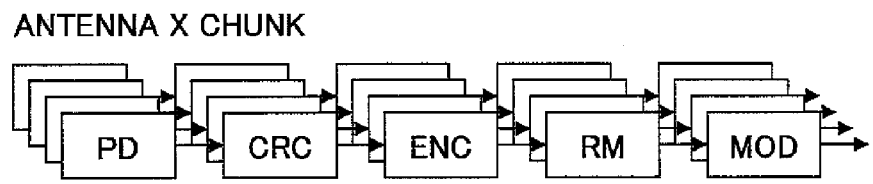
FIG. 9D is a block diagram showing a part of the transmitter of the MIMO multiplexing method.

Further, the transmitter may be configured such that antenna independent AMC and antenna independent HARQ may be performed as shown in FIG. 9D (this configuration is called Configuration D).

This transmitter includes a number of transmitting units. Each transmitting unit includes the CRC unit into which PD is input, ENC that is connected to the CRC unit, RM that is connected to ENC, and MOD connected to RM. Here, the number of the transmitting unit is equal to the number of the antennas×the number of frequency-blocks. According to this transmitter, HARQ is also independently performed for each antenna.

Next, the case wherein the antennas are associated with independent transmitting blocks (PARC), and the frequency blocks belong to a lower rank layer is described.

Figure 10A:
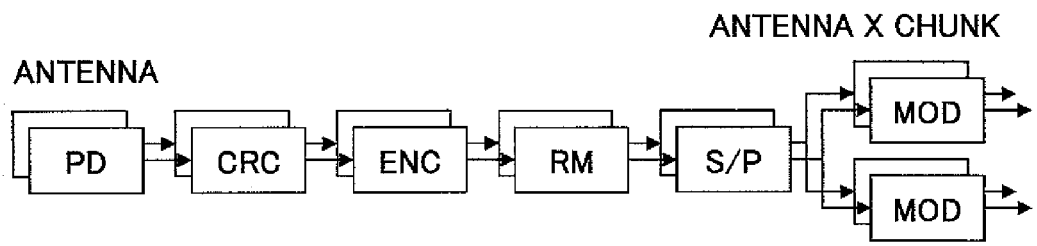
FIG. 10A is a block diagram showing a part of the transmitter of the MIMO multiplexing method.

A transmitter is configured as shown in FIG. 10A, wherein the transmitter is configured so that the antenna independent AMC and the antenna independent HARQ may be performed (this configuration is hereafter called Configuration E). According to this transmitter, rate matching is performed according to the size of the frequency block.

Specifically, the transmitter includes the same number of transmitting units as the antennas. Each transmitting unit includes the CRC unit into which PD is input, ENC that is connected to the CRC unit, RM that is connected to ENC, S/P connected to RM, MOD into which the signal that is serial/parallel converted by S/P is input for each frequency block.

According to this transmitter, CRC is added to transmitting data by the CRC unit, channel coding is performed by ENC, the encoding rate is changed by RM to a rate determined by AMC, the signal is divided into 2 signals by S/P (here, "2" is the number of the frequency blocks), mapping is performed by MOD according to a modulation method determined by AMC for the divided signals, and then the signals are transmitted in corresponding frequency blocks.

Since the AMC process is performed for each antenna, the AMC process can be performed based on the level difference between the antennas, for example, the difference of received power; accordingly, a good data channel characteristic is obtained. Further, since the rate control for each antenna is performed only by modulation in this way, a good data channel characteristic is acquired when a coding unit goes beyond an antenna. When changing the frequency block and the transmission rate for each antenna by AMC for transmitting the data that are channel coded with two or more antennas and frequency blocks, a better characteristic is obtained by changing the modulation method rather than by changing the encoding rate.

Further, since the common HARQ process is performed for the antennas, a good data channel characteristic is obtained by the diversity. In fact, an average level difference for each antenna due to the multipaths, and the like is not great. The antenna independent HARQ is more desirable from the viewpoint of a decoding unit. For example, the case wherein data are transmitted at 100 Mbps is described. When there is only one decoding unit, which may be, for example, a turbo decoding unit, the single decoding unit has to process the entire 100 Mbps. On the other hand, when the number of decoding units is two, each unit is required to process 50 Mbps in parallel, which is more desirable.

Figure 10B:
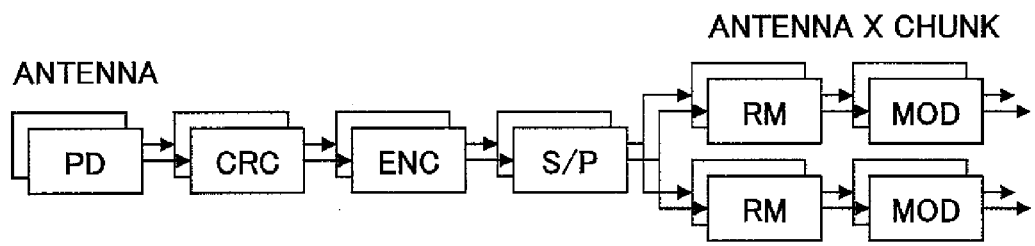
FIG. 10B is a block diagram showing a part of the transmitter of the MIMO multiplexing method.

Further, the transmitter may be configured so that the antenna independent AMC and the antenna independent HARQ may be performed as shown in FIG. 10B (this configuration is hereafter called Configuration F). According to this transmitter, rate matching is performed after a frequency block is assigned to the encoded symbol.

Specifically, the transmitter includes a number of transmitting units, wherein the number is equal to the number of the antennas. Each transmitting unit includes the CRC unit into which PD is input, ENC that is connected to the CRC unit, S/P connected to ENC, RM into which the signal that is serial/parallel converted by S/P for each frequency block is input, and MOD connected to RM. According to this transmitter, rate matching and data modulation are performed after S/P.

Figure 10C:
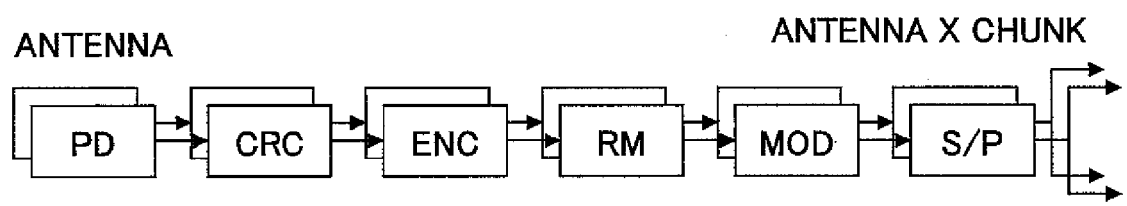
FIG. 10C is a block diagram showing a part of the transmitter of the MIMO multiplexing method.

Further, the transmitter may be configured so that antenna independent AMC and antenna independent HARQ may be performed as shown in FIG. 10C (this configuration is hereafter called Configuration G).

Specifically, this transmitter includes a number of transmitting units, wherein the number is equal to the number of the antennas. Each transmitting unit includes the CRC unit into which PD is input, ENC that is connected to the CRC unit, RM that is connected to ENC, MOD that is connected to RM, and S/P connected to MOD. That is, the transmitter here includes a number of the transmitters described with reference to FIG. 9A, where the number is equal to the number of the antennas. The same MCS is used to the frequency blocks. In this way, the number of signaling bits can be decreased.

FIG. 11 is a block diagram of the receiver according to the embodiment of the present invention. Although this receiver is typically used by a mobile station, it can be used by other apparatuses. Although the receiver includes two transmission antennas, this is for example only. The number of the receiving antennas may be any suitable number. A receiver 1000 includes a control channel demodulating unit 1002, switching units 1004-1, 2 and 1006, a receiving unit 1008 for beam forming, a receiving unit 1010 for MIMO diversity, a receiving unit 1012 for MIMO multiplexing, a channel decoding unit 1014, a channel estimating unit 1016, a receiving quality measuring unit (reception SIR measuring unit) 1018, a fading correlation measuring unit 1020, and a control information transmitting unit 1022.

The control channel demodulating unit 1002 demodulates the control channel received with the receiving antenna, and determines a multi-antenna transmission method, a modulation method, an encoding rate, and the like that should be used in communications.

Switching units 1004-1 and 2 provide the signals received with each antenna to the receiving unit 1008 for beam forming, the receiving unit 1010 for MIMO diversity, or the receiving unit 1012 for MIMO multiplex according to the multi-antenna transmission method determined by the control channel demodulating unit 1002. The switching unit 1006 provides outputs from the receiving units to the channel decoding unit 1014.

The receiving unit 1008 for beam forming includes a maximum ratio combining unit 1011, and a data demodulating unit 1013. The maximum ratio combining unit 1011 combines signals received with the antennas so that the gain may be maximized. Although maximum ratio combining is used in this embodiment, other combining methods commonly known in the technical field may be used. For example, a signal from an antenna that is better is selected, and the other signal may be discarded. The data demodulating unit 1013 demodulates the data according to the determined modulation method and the determined encoding rate, and outputs the demodulated data.

The receiving unit 1010 for MIMO diversity includes a space-time decoding unit 1015, and a data demodulating unit 1017. The space-time decoding unit 1015 generates and outputs one data sequence from two or more data sequences that are input. The space-time decoding unit 1015 decodes the signal that is space-time block coded (STBC). For example, in the case shown in FIG. 1B, $R_1 = B+A^*$ is received in the first TTI, and $R_2 = A-B^*$ is received in the next TTI. Therefore, the transmitted symbols A and B can be derived by computing $(R1^*+R2)/2$ and $(R1+R2^*)/2$. Such space-time decoding process, or linear process, is performed by the space-time decoding unit 1015. The data demodulating unit 1017 demodulates the data according to the determined modulation method and the determined encoding rate, and outputs the demodulated data.

The receiving unit 1012 for MIMO multiplexing method includes a signal separating unit 1019 for separating and demodulating a signal transmitted by the MIMO multiplexing method with a-suitable signal separating method. As the signal separating method, a blasting (BLAST) method, a MMSE method, a MLD method, etc., may be used.

The channel decoding unit 1014 outputs the demodulated data after performing error correction.

The channel estimating unit 1016 performs channel estimation for each receiving antenna, and outputs a channel estimation value. The channel estimation value is provided to respective receiving units of the maximum ratio combining unit 1011, the space-time decoding unit 1015, and the signal separating unit 1019.

The receiving quality measuring unit 1018 measures the quality (SIR, according to the embodiment) of the received signal of each antenna, and outputs a reception SIR value.

The fading correlation measuring unit 1020 measures a fading correlation value based on the received signals. A fading correlation value expresses a degree of similarity of radio propagation paths about the corresponding transmission antennas. For example, if the same fading is observed on two radio propagation paths, the fading correlation value takes a value near 1, and shows that the radio propagation paths are similar. On the contrary, if fading is completely different on two radio propagation paths, the fading correlation value takes a value near 0, and shows that the radio propagation paths are not similar.

The control information transmitting unit 1022 generates a control channel that includes the reception SIR value and the fading correlation value, and reports the values to the transmitter. The number $N_{RX}$ of the receiving antennas of the receiver may be contained in the control channel, if needed.

Next, the transmission method of the control channel in the case of the MIMO transmission is described.

First, the bit configuration of control bits, i.e., a control channel, required at the time of MIMO transmission is described with reference to FIGS. 12 through 15.

First, the control bits that are transmitted when the MIMO transmission (that is, the MIMO multiplexing method and the MIMO diversity method) is selected are described.

When either of MIMO multiplex and MIMO diversity is selected, information showing a transmission antenna number and the kind of the MIMO transmission method is transmitted by the common control channel.

The information showing the transmission antenna number includes the number of transmission antennas. For example, if a base station includes four antennas, and if the number of transmission antennas is to be selected out of 1, 2, 3, and 4, 15 combinations are possible and 15 kinds of information are required, i.e., and 4+6+4+1=15. That is, 4 bits are required.

For the information showing the kinds of MIMO transmission methods, 3 kinds of information are necessary, one each for the MIMO multiplexing, the MIMO diversity, and the adaptive beam forming. That is, 2 bits are required. If the MIMO transmission method is defined only at the time of a communication start, it is not necessary to transmit this information by the common control channel.

Further, when assigning a frequency block in the case of MIMO multiplexing, it is more desirable to assign frequency blocks in a common frequency band to the same user concerning all the antennas. In this way, it is not necessary to increase the number of control bits for frequency block assignment for indicating the assigned frequency block. Further, when a frequency block of a common frequency band is assigned to a different user, except MMSE reception, the characteristic is degraded and signal detection accuracy of a transmitted signal to the different user is degraded. Further, when demodulating a signal transmitted to a receiver, a signal for another receiver has to be demodulated; and the process becomes complicated.

In the following, the control bit required when assigning a frequency block of a common frequency band of all the antennas to the same user is described in two parts, one part about a control bit required for scheduling, and the other about a control bit required for an adaptive modulation/demodulation and data channel coding.

Next, the case wherein a single antenna transmission is performed and the MIMO multiplexing method is used (Configuration A, and Configuration F) is described.

The control bits required for scheduling are first described with reference to FIG. 12.

The control bits required for scheduling include UE identity that indicates a user ID, an assigned receiver, for example, user number information, and frequency assignment information.

The UE identity is convoluted into CRC on the transmission side, and is decoded on the receiving side so that the transmission is duly for the receiver. Therefore, the number of the control bits required for the UE identity is 0 whether the single antenna transmission is performed or the MIMO multiplexing is performed.

The number of bits needed for the frequency block assignment information is $N_{user} \times N_{chunk}$, $N_{user} \times N_{chunk}$, and $N_{user} \times N_{chunk}$ for the single antenna transmission, the MIMO multiplexing (Configuration A), and the MIMO multiplexing (Configuration F), respectively. Here, $N_{chunk}$ is the number of the frequency blocks in one frame, and $N_{user}$ is the maximum number of users that are multiplexed into one frame.

Next, control bits required for the adaptive modulation and data channel coding is described with reference to FIG. 13.

As for the control bits required of the MIMO transmission, there are AMC bits, HARQ bits, a bit for scheduling, and CQI for MIMO.

The AMC is about 10 to 20 bits long per unit, and includes information about the modulation method, the rate of the channel coding, and the MIMO transmission method currently used. The AMC bits are transmitted by one of the following methods; namely, independently for each transmission antenna, commonly by the transmission antennas, and by each transmission antenna group. When commonly transmitted by the transmission antennas, one unit/frame is transmitted. When transmitted antenna independent, $N_{ant}$ units/frame are transmitted. When transmitted for each transmission antenna group, $N_{ant}$ units/frame are transmitted.

Here, $N_{ant}$ in the case of antenna independent transmission is the number of the transmission antennas, and $N_{ant}$ in the case of transmitting for each transmission antenna group is the number of transmission antenna groups.

FIG. 14 shows the control bits required for AMC control. The bits for AMC include modulation scheme information and transport block size information as illustrated.

The modulation scheme information is for indicating a data modulation method such as QPSK, 16QAM, and 64QAM. The number of bits needed for the modulation scheme information is $2 \times N_{chunk}$, $2 \times N_{chunk} \times N_{ant}$, and $2 \times N_{chunk} \times N_{ant}$ for the single antenna transmission, the MIMO multiplexing (Configuration A), and the MIMO multiplexing (Configuration F), respectively. Here, $N_{chunk}$ is the number of frequency blocks in one frame. That is, at the time of MIMO multiplexing, the number of bits required is multiplied by the number of the antennas compared with the single antenna transmission.

The transport block size information includes information indicating the encoding rate. The number of bits needed is $8 \times N_{chunk}$, $8 \times N_{chunk}$, and $8 \times N_{chunk} \times N_{ant}$ for the single antenna transmission, the MIMO multiplexing (Configuration A), and the MIMO multiplexing (Configuration F), respectively. Here, $N_{chunk}$ is the number of frequency blocks in one frame. That is, at the time of MIMO multiplexing, in the case of Configuration A, the number of bits required is the same as the single antenna transmission, and in the case of Configuration F, the number of bits required is multiplied by the number of the antennas compared with the single antenna transmission.

The bits for HARQ, which is about 7 bits long, contain information indicating ACK/NACK, whether a resending packet or not, transmitting pattern information about the resending packet, and the like. The bits for HARQ are transmitted by one of the following methods; namely, independently for each transmission antenna, commonly by the transmission antennas, and for each transmission antenna group. When commonly transmitting by the transmission antennas, one unit/frame is transmitted. When transmitted antenna independent, $N_{ant}$ units/frame are transmitted. When transmitted for each antenna group, $N_{ant}$ units/frame are transmitted. Here, $N_{ant}$ in the case of antenna independent transmission is the number of the transmission antennas, and $N_{ant}$ in the case of transmitting for each transmission antenna group is the number of transmission antenna groups.

FIG. 15 shows the control bits required for HARQ. The bits for HARQ include HARQ process information (Hybrid-ARQ process information), a redundancy version and a constellation version, and a new data indicator that is information indicating whether they are new data.

The HARQ process information shows an N channel Stop-and-Wait process number. For example, 3 bits are needed if RTT=6TTI.

The number of bits needed for the HARQ process information is $3 \times N_{chunk}$, $3 \times N_{chunk}$, and $3 \times N_{chunk} \times N_{ant}$ for the single antenna transmission, the MIMO multiplexing (Configuration A), and the MIMO multiplexing (Configuration F), respectively. Here, $N_{chunk}$ is the number of frequency blocks in one frame. That is, the number of bits needed for the HARQ process information at the time of MIMO multiplexing is the same as the single antenna transmission in Configuration A, and is multiplied by the number of antennas in Configuration F.

The information indicating the redundancy version and the constellation version should discriminate four constellation arrangements and four puncture patterns as a constellation pattern. Of the total 16 combinations, eight are used. Therefore, 3 bits are required.

The number of bits needed for the information indicating the redundant version and the constellation version is $3 \times N_{chunk}$, $3 \times N_{chunk}$, and $3 \times N_{chunk} \times N_{ant}$ for the single antenna transmission, the MIMO multiplexing (Configuration A), and the MIMO multiplexing (Configuration F), respectively. Here, $N_{chunk}$ is the number of frequency blocks in one frame. That is, the number of bits required at the time of MIMO multiplexing is the same as the single antenna transmission in Configuration A, and is multiplied by the number of antennas in Configuration F.

The information indicating new data is for discriminating whether a packet is a new one or a resending packet in order to avoid erroneous combining in consideration of an ACK/NACK bit error. The information indicating new data requires 1 bit.

The number of bits needed for the information indicating the new data is $N_{chunk}$, $N_{chunk}$, and $N_{chunk} \times N_{ant}$ for the single antenna transmission, the MIMO multiplexing (Configuration A), and the MIMO multiplexing (Configuration F), respectively. Here, $N_{chunk}$ is the number of frequency blocks in one frame. That is, the number of bits required at the time of MIMO multiplexing is the same as the single antenna transmission in Configuration A, and is multiplied by the number of antennas in Configuration F.

The bits for scheduling are information that indicates a user who is assigned, as described above, and is about 10 bits long. The bits for scheduling are transmitted by one of the following methods, namely, independently by each transmission antenna, commonly by the transmission antennas, and each transmission antenna group. When commonly transmitted by the transmission antenna, 1 unit/frame is transmitted. When transmitted antenna independent, $N_{ant}$ units/frame are transmitted. When transmitted for each transmission antenna group, $N_{ant}$ units/frame are transmitted. Here, $N_{ant}$ when transmitted by antenna independent transmission is the number of transmission antennas, and $N_{ant}$ when transmitted for each transmission antenna group is the number of the transmission antenna groups.

CQI for MIMO is information indicating the channel state feedback information for AMC and antenna switching control, and is about 7 bits long. CQI for MIMO indicates, for example, fading correlation and SIR for each antenna. CQI for MIMO is transmitted by one of the following methods, namely, for each transmission antenna, in common to the antennas, and for each transmission antenna group. When transmitted in common to the transmission antennas, one unit/frame is transmitted. When transmitted antenna independent, $N_{ant}$ units/frame are transmitted. When transmitted for each antenna group, $N_{ant}$ units/frame are transmitted. Here, $N_{ant}$ when transmitted by antenna independently is the number of the transmission antennas, and $N_{ant}$ when transmitted for each transmission antenna group is the number of the transmission antenna groups.

Figure 16A:
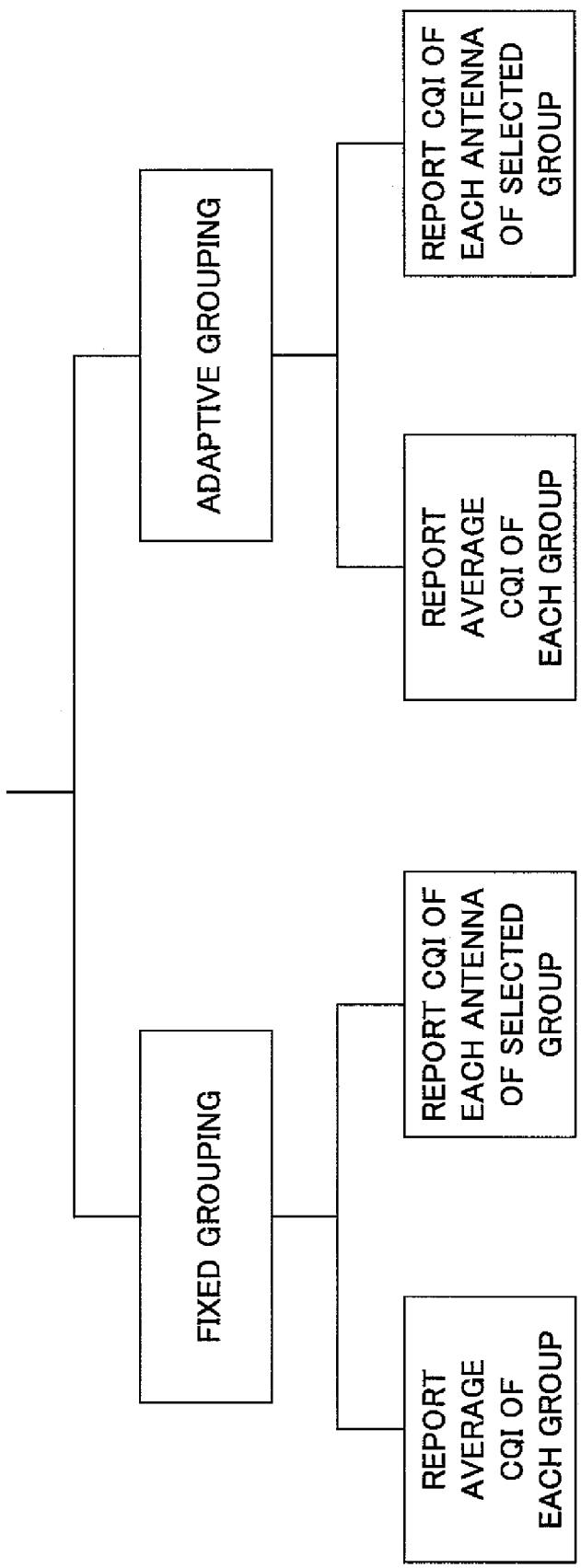
FIG. 16A is a chart for explaining an AMC and CQI bit number reduction.

Next, a method of reducing the number of AMC and CQI bits in the MIMO multiplexing method is described with reference to FIGS. 16A through 16C.

CQI information of each frequency block in a sub-frame or a frame corresponding to an antenna is fed back to the base station by an uplink control channel.

The control information transmitting unit 320 reduces the number of the CQI bits by thinning out the CQI bits between antennas, in time, and in frequency. Antennas, frequency blocks, and sub-frames are divided into groups. Within a group, only one CQI bit is fed back. In this case, an average value of the CQI bit between the antennas, in the frequency, and in the time is notified.

In the following, the method of reducing the CQI bit by dividing the antennas into groups is described; nevertheless, the same is said of the case wherein either of time and frequency block is divided into groups. Further, a combination of grouping may be used.

Here, there is the case wherein antennas to be grouped are fixed (fixed grouping), and the case wherein antennas to be grouped are adaptively changed (adaptive grouping).

In either case of fixed grouping and adaptive grouping, an average CQI of each group may be reported, or alternatively, CQI of each antenna in a selected group may be reported.

Here, the case wherein the transmitter 300 includes four antennas, and the antennas are divided into two groups is described with reference to FIG. 16B.

For example, transmitter antennas Antenna 1, Antenna 2, Antenna 3, and Antenna 4, of the transmitter are fixed in a group.

In fixed grouping the transmission antennas, Antennas 1 and 2 are grouped into a group 1; and Antennas 3 and 4 are grouped into a group 2, for example.

The control information transmitting unit 320 compares an average CQI of the group 1 with an average CQI of the group 2, and reports the CQI of the two antennas of a group that has the greater average CQI.

In this way, it is not necessary to transmit information about grouping.

Next, when performing adaptive grouping, adaptive grouping may be performed based on, for example, a channel state. In this case, CQI of N (<4) antennas are reported in a descending order of the channel state.

Further, transmission may be carried out by combining frequency blocks with good receiving quality without grouping.

Here, grouping between antennas is described.

The control information transmitting unit 320 may decrease the number of control bits by summarizing at least one of AMC and HARQ processes for each antenna by grouping the transmission antennas. Further, the control information transmitting unit 320 reduces characteristic degradation by collectively processing by selecting a group of the transmission antennas.

For example, the case wherein the transmitter 300 includes four antennas and the antennas are divided into two groups is described with reference to FIG. 16C.

For example, the transmitter including transmission antennas Antenna 1, Antenna 2, Antenna 3, and Antenna 4, divides the transmission antennas into fixed groups. Further, grouping may be adaptively carried out. When adaptively grouping, grouping may be carried out based on, for example, the channel state.

When the transmission antennas are fixed in groups, for example, Antennas 1 and 2 are grouped into a group 1; and Antennas 3 and 4 are grouped into a group 2. In this way, grouped transmission to the receiver 1000 is carried out without the grouping information.

When grouping based on the channel state, if the channel state is the best with Antenna 2, the second best with Antenna 3, the third best with Antenna 1, and then Antenna 4, grouping can be carried out as follows:

Group 1 consists of Antennas 2 and 3, and Group 2 consists of Antennas 1 and 4;

Group 1 consists of Antenna 2, and Group 2 consists of Antennas 1, and 3 and 4; and Group 1 consists of Antenna 1, and 2, 3, and Group 2 consists of Antenna 4. For example, a threshold value about the channel state is beforehand defined, and grouping is performed by comparing the channel state with the threshold value. Since grouping is performed based on the channel state, transmission quality is improved.

Further, the control information transmitting unit 320 may report difference information in order to reduce the number of AMC and CQI bits at the time of MIMO multiplexing.

Between the antennas, there are not so great differences about the AMC in formation and CQI information. For this reason, the control information transmitting unit 320 does not send absolute-value information for each antenna, but sends absolute-value information of a predetermined criteria antenna, and information about differences of other antennas with reference to the criteria antenna. The number of control bits to transmit can be reduced in this way.

For example, the case wherein the transmitter includes four antennas that independently transmit AMC information is described with reference to FIG. 17. Here, the number of MCSs is 16, for example.

Since there are 16 MCS numbers, 4 bits are required to transmit absolute information. That is, for transmitting the absolute information, 4 bits×4 antennas=16 bits are required.

If the difference information is reported, and if the number of bits required for transmitting the difference information is 2, 4 bits+2 bits×3 antennas=10 bits are required.

Accordingly, where the difference information is transmitted, 4 bits can be reduced compared with transmitting the absolute information.

Although the case wherein the AMC information is transmitted is described here, the same is true for MCS and CQI.

Next, a control channel transmission method using two or more transmission antennas is described.

Figures 17, 18A:
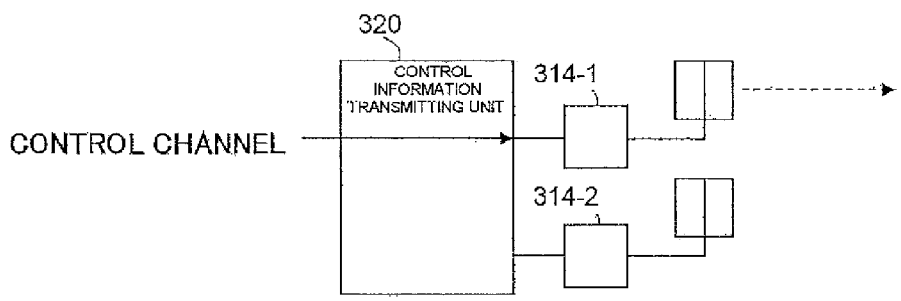
FIG. 17 is a chart for explaining the AMC and CQI bit number reduction.
FIG. 18A is a schematic diagram showing a transmission method of a control channel.

The control information transmitting unit 320 transmits the control information using one antenna as shown in FIG. 18A. In this case, the control information transmitting unit 320 provides the control information to the combining unit 314-1. Consequently, the control information is transmitted from the transmission antenna 1. In this way, terminals having different quantities of transmission antennas use the same transmission method; for this reason, the configuration of a system, for example, a transmitter, is simplified. Further, the configuration is simplified even when the receiver 1000 has two or more receiving antennas.

Figure 18B:
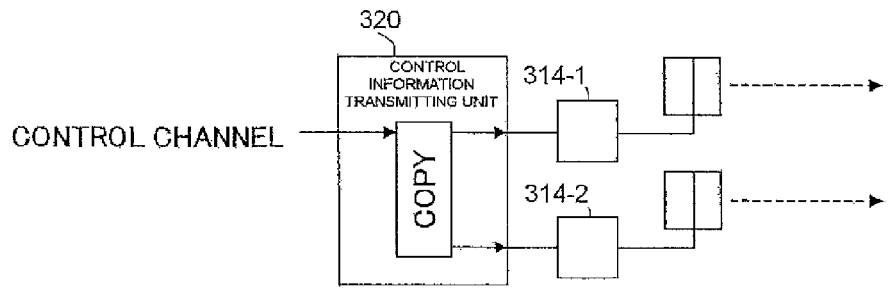
FIG. 18B is a schematic diagram showing a transmission method of the control channel.

Further, the control information transmitting unit 320 may be configured to transmit the control information using two or more antennas as shown in FIG. 18B. In this case, the control information transmitting unit 320 duplicates the control information, and provides the copies to the combining units 314-1 and 314-2. Consequently, the control information is transmitted from the transmission antennas 1 and 2. In this way, the configuration of a system, for example, a transmitter is simplified. On the reception side, the pilot channel from the two transmission antennas is recognized, channel estimation is performed, and the phase angle of a combined received signal is detected by, for example, a synchronous detection. Since the transmission is carried out by the two antennas, transmission power of each antenna can be reduced compared with the method described with reference to FIG. 18A. Further, total transmission power can be increased. That is, transmission power can be raised compared with the case where transmission is performed with one antenna.

Figure 18C:
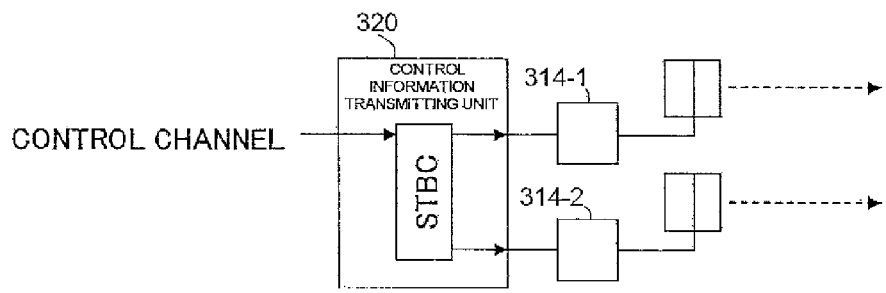
FIG. 18C is a schematic diagram showing a transmission method of the control channel.

Further, the control information transmitting unit 320 may be configured such that the control information be transmitted by the MIMO diversity method using two or more antennas as shown in FIG. 18C. In this way, the transmitting diversity effect is obtained. Further, compared with the method described with reference to FIG. 18A, the transmission power of each antenna can be reduced.

Figure 18D:
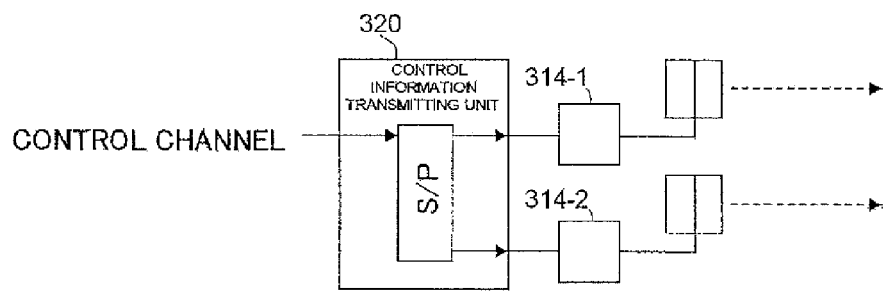
FIG. 18D is a schematic diagram showing a transmission method of the control channel.

Further, the control information transmitting unit 320 may be configured such that the control information be transmitted by the MIMO multiplex method using two or more antennas as shown in FIG. 18D. In this way, the information bit rate can be multiplied by the number of the transmission antennas. Further, frequency use effectiveness is improved. Further, as compared with the method described with reference to FIG. 18A, the transmission power of each antenna can be reduced.

Next, according to the control channel transmission method using two or more transmission antennas described above, the control information is transmitted from the antennas by the following transmission method.

Figure 19A:
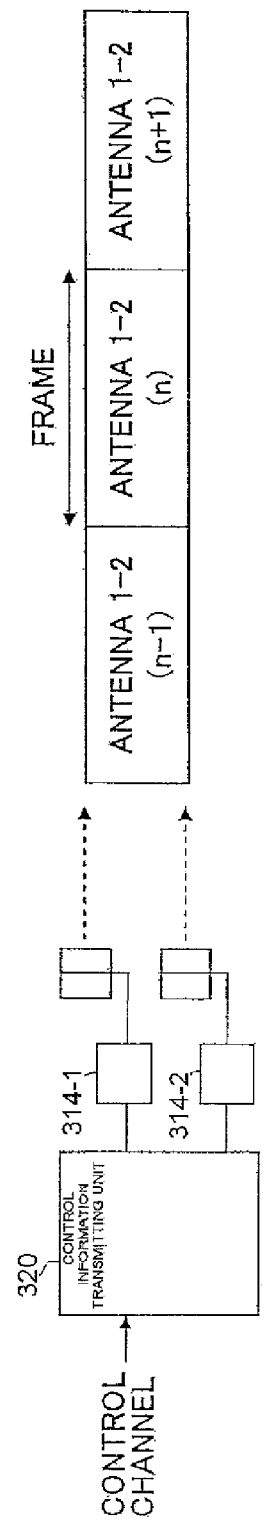
FIG. 19A is a schematic diagram showing a transmission method of the control channel for each transmission antenna.

The control information transmitting unit 320 controls such that information for all the antennas may be transmitted within one frame as shown in FIG. 19A. Further, the control information transmitting unit 320 may be configured such that the information for all the antennas may be transmitted within one slot. In this way, increase of control delay can be prevented when transmitting the control information with two or more antennas.

Figure 19B:
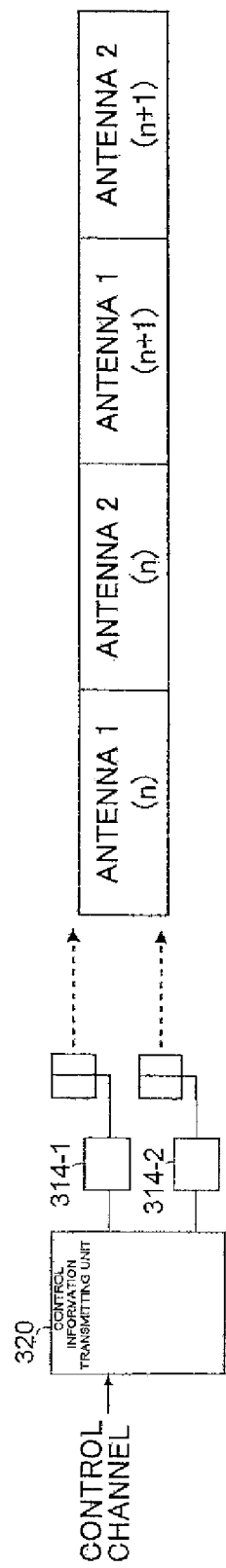
FIG. 19B is a schematic diagram showing a transmission method of the control channel for each transmission antenna.

Further, the control information transmitting unit 320 may be configured to transmit different information for antennas in each frame in sequence as shown in FIG. 19B. Further, the control information transmitting unit 320 may be configured to transmit different information for antennas in sequence in each slot. In this way, the same control channel configuration as the case where transmission is carried out with one antenna can be used. That is, it becomes unnecessary to change the control channel configuration for terminals that have different numbers of antennas. Further, the number of control bits can be made small.

Figure 4A:
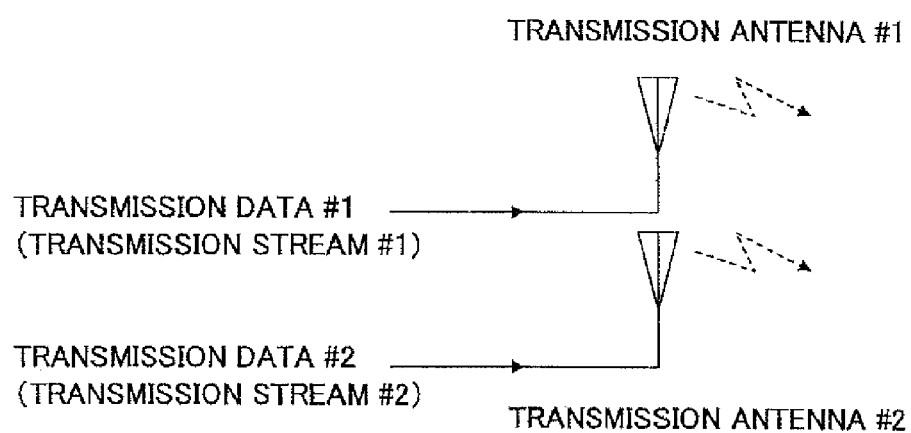
FIG. 4A is a schematic drawing for describing a type of the MIMO multiplexing method.
Figure 4B:
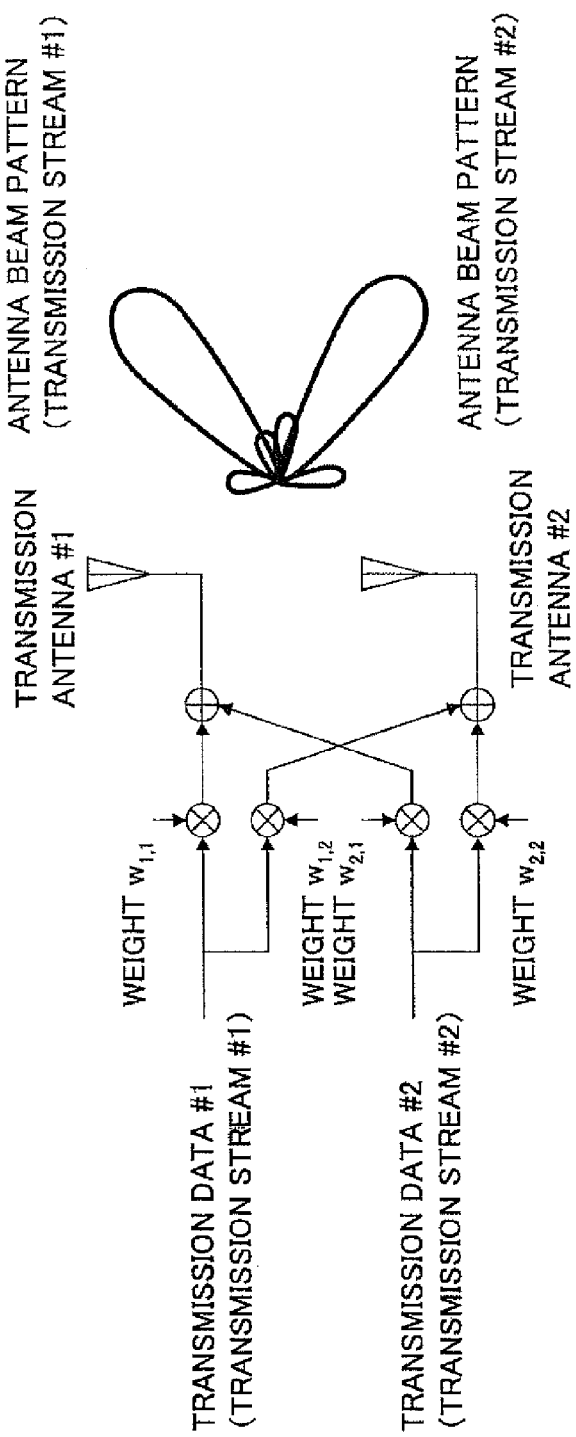
FIG. 4B is a schematic drawing for describing another type of the MIMO multiplexing method.

The control channel transmission method described above can be applied to the case described with reference to FIG. 4A wherein different data are transmitted by each transmission antenna, and the case described with reference to FIG. 4B wherein different data are transmitted by each transmitting beam.

FIG. 20 shows the outline of the method performed by the multi-antenna system according to the embodiment of the present invention. Although the case wherein the transmitter is a base station and the receiver is a mobile station is described, this is for convenience of description, and the present invention is not limited to such formation. At step 602, the number $N_{RX}$ of receiving antennas is reported to the transmitter from the receiver. The number $N_{RX}$ of the receiving antennas does not have to be frequently transmitted to the transmitter, but is just once reported during communications. For example, it may be once reported at the time of establishing a radio link for the receiver. The transmitter can obtain a suitable number of antennas for transmission by knowing the received number $N_{RX}$ of the receiving antennas, and the number $N_{TX}$ of the transmission antennas of the transmitter. For example, if the MIMO multiplexing method is performed, transmission has to be performed with the smaller of the number $N_{TX}$ of the transmission antennas and the number $N_{RX}$ of the receiving antennas. If one of the MIMO diversity method and the adaptive array antenna method is performed, the $N_{TX}$ transmission antennas can be used as it is.

At step 604, the transmitter receives the control channel from the receiver. The control channel includes at least a fading correlation value, and a received signal quality (a reception SIR value, according to the embodiment) of the receiver. At step 604, a transmission method is determined based on the reception SIR and the fading correlation values.

As described above, the contents determined include information about a multi-antenna transmission method (one of the adaptive array antenna method, the MIMO diversity method, and the MIMO multiplexing method) to be performed by the transmitter 300.

Figure 21:
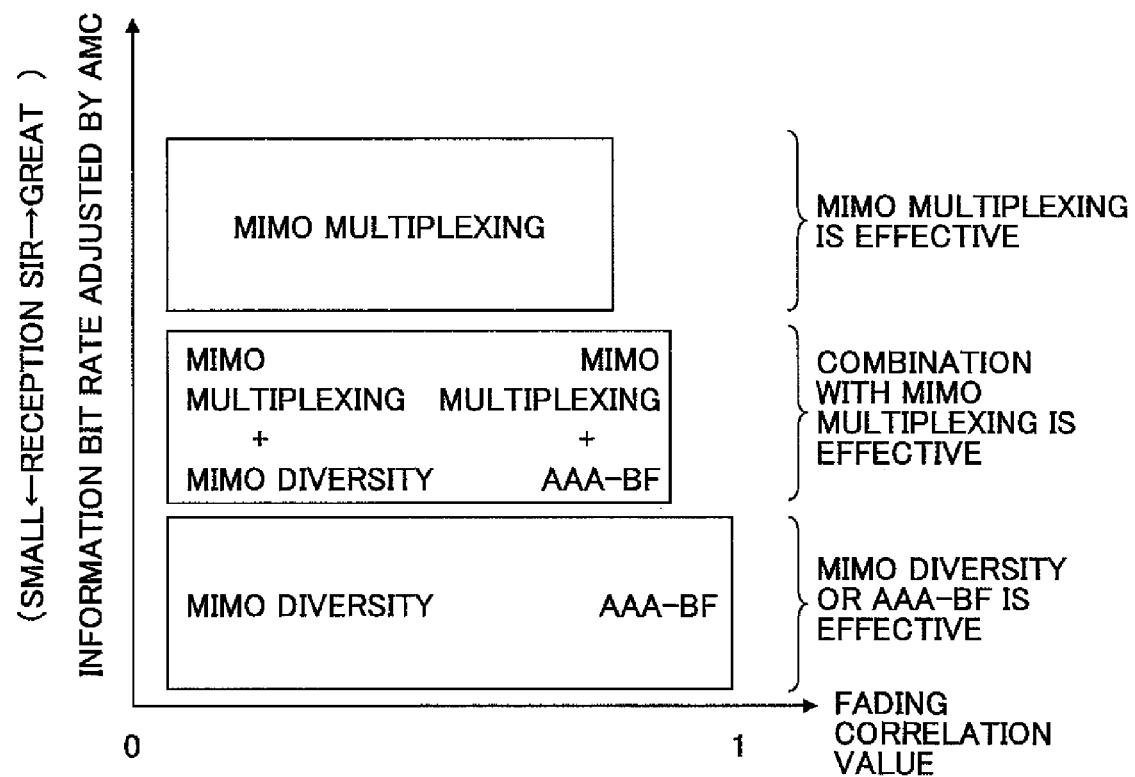
FIG. 21 shows relationships between reception SIR, a fading correlation value, and the multi-antenna transmission methods.

FIG. 21 schematically shows correspondence relationships between the reception SIR value, the fading correlation value, and the multi-antenna transmission methods. The vertical axis shows the reception SIR value, and the horizontal axis shows the fading correlation value. When the reception SIR value is great, it is desirable to increase the bit rate by using the MIMO multiplexing method, since the state of the radio propagation path is generally good. On the contrary, when the reception SIR value is small, the situation of the radio propagation path is poor; accordingly, a multi-antenna transmission method that increases reliability is desirable, and one of the MIMO diversity method and the adaptive array antenna method may be used. On the other hand, when the fading correlation value is small, the radio propagation paths about the transmission antennas are not similar; accordingly, a multi-antenna transmission method that independently uses the radio propagation paths is desirable. That is, the MIMO multiplexing method and the MIMO diversity method may be used. On the contrary, when the fading correlation value is great, the radio propagation paths about the transmission antennas are similar; accordingly, the adaptive array antenna method is desirable. In FIG. 21 a domain is prepared, wherein a combination of the MIMO multiplexing method and the MIMO diversity method is used between the domain where the MIMO multiplexing method is desirable and the domain where the MIMO diversity method is desirable. Further, a domain is prepared, wherein a combination of the MIMO multiplexing method and the adaptive array antenna method is used between the domain where the MIMO multiplexing method is desirable and the domain where the adaptive array antenna method is desirable.

Figure 5A:
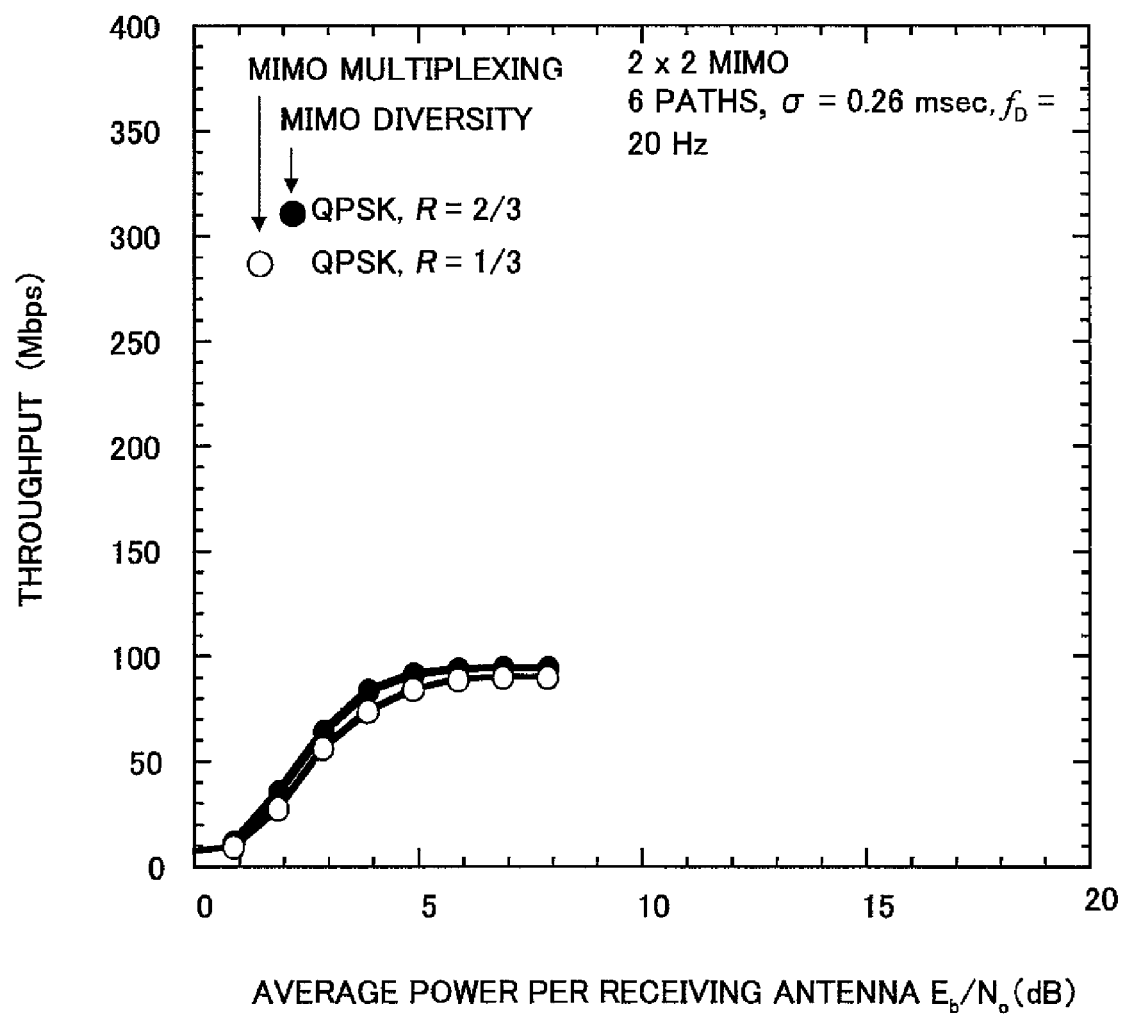
FIG. 5A is a graph showing an example of comparison of the throughput of a mobile station between the MIMO multiplexing method and the MIMO diversity method (when the information bit rate is 90 Mbps/100 MHz).
Figure 5B:
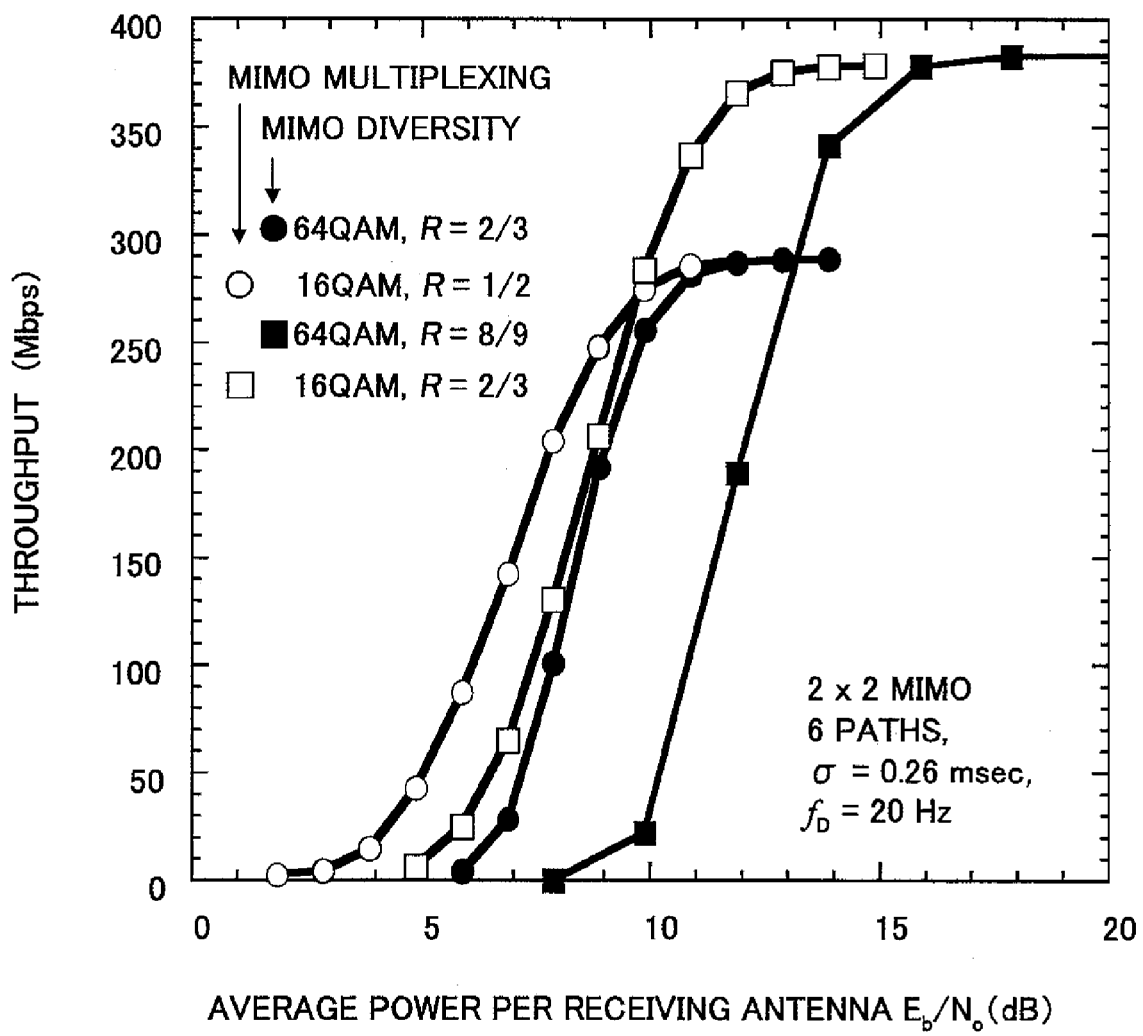
FIG. 5B is a graph showing an example of comparison of the throughput of the mobile station between the MIMO multiplexing method and the MIMO diversity method (when the information bit rates are 290 and 380 Mbps/100 MHz).

Here, although the reception SIR value is shown in the vertical axis, the bit rate transmitted by the base station may be associated with the vertical axis. For example, the MIMO diversity method or the adaptive array antenna method is associated with a low bit rate (2 bits per second/Hz or less) range, and the MIMO multiplexing method is associated with a high bit rate (5 bits per second/Hz or greater) range. Further the combinations of the transmission methods may be associated with a middle bit rate range (4 to 5 bits per second/Hz). For example, in FIG. 5A the information bit rate is 90 Mbps/100 MHz=0.9 bits per second/Hz, which belongs to the low bit rate range; accordingly, the MIMO diversity or the adaptive array antenna method is determined to be desirable.

FIG. 22 schematically shows when changing the multi-antenna transmission method depending on the magnitude of the fading correlation value. When the fading correlation value is small (near 0), the radio propagation paths of the transmission antennas are mutually dissimilar; accordingly, one of the MIMO diversity and the MIMO multiplexing method is used. On the contrary, when the fading correlation value is great (near 1), the radio propagation paths of the transmission antenna are mutually similar; accordingly, the adaptive array antenna method is used. Whether the radio propagation paths of the transmission antenna are similar is relatively determined based on not only antenna spacing but also a distance between the transmitter and the receiver and other environmental parameters.

For example, suppose spacing of the transmitter antennas is about ½ wavelength. In this case, the radio propagation paths to a receiver under an inside-of-a-house environment may not be mutually similar as shown at the top of FIG. 22; accordingly, the MIMO method may be used. However, if the radio propagation paths to a receiver that is located at a distant place under an outdoor environment are mutually similar as shown at the bottom of FIG. 22, the adaptive array antenna method may be used.

FIG. 23 shows an example of tables used when switching the multi-antenna transmission methods as described with reference to FIG. 22. The tables are prepared for the multi-antenna transmission methods; namely, the MIMO multiplexing method, the MIMO diversity method, and the adaptive array antenna method. The tables define correspondence relationships between the reception SIR values, the fading correlation values, and the MCS numbers. The MCS numbers correspond to the combinations of the modulation methods and the encoding rates as illustrated in FIG. 8. As described above, as the MCS number is incremented, the reliability becomes low and the bit rate becomes high. In the tables shown in FIG. 23, as the reception SIR becomes great, the MCS number also becomes great. This is because, if the reception SIR is great, the state of the radio propagation path is good, and good communications are available at a great bit rate. As for the tables for the MIMO multiplex and the MIMO diversity, when the fading correlation value is small, the MCS number is generally great, and when the fading correlation value is great, the MCS number is small. This is because, if the fading correlation value is small, the radio propagation paths of the antennas are not mutually similar, and the space can be variously used. Accordingly, the MIMO multiplexing method and the MIMO diversity method are desirable. On the contrary, if the fading correlation value is great, since the radio propagation paths are mutually similar, the effectiveness of MIMO multiplexing and MIMO diversity cannot be fully enjoyed. As for the table for adaptive array antennas, when the fading correlation value is great, the MCS number is great. This is because that a directional beam is formed by the adaptive array antenna method, which is desirable when the radio propagation paths are mutually similar. Further, when the fading correlation value is small, the MCS number is small. This is because the radio propagation paths are not mutually similar, and it is hard to raise the antenna gain by beam forming.

At step 604 in FIG. 20, the transmission method control unit 316 shown in FIG. 6 of the transmitter selects a multi-antenna transmission method and a MCS number based on the reception SIR value and the fading correlation value that are provided by the receiver. One MCS number is selected by referring to the reception SIR value and the fading correlation value of each of the tables in FIG. 23, and three MCS numbers are selected from the three tables. Out of the selected MCS numbers, the transmitter selects a multi-antenna transmission method that gives the greatest bit rate. In the case of the MIMO diversity method and the beam forming method, the bit rate is determined by the modulation method and the rate of channel coding that are obtained from the MCS number. In the case of the MIMO multiplexing method, the bit rate is obtained by multiplying the MCS number and the number $N_{TX}$ of the transmission antennas. For example, suppose that a certain reception SIR value and a certain fading correlation value are provided to the transmitter, and MCS2 is drawn from the table for MIMO multiplexing, MCS3 is drawn from the table for MIMO diversity, and MCS2 is drawn from the table for beam forming, wherein the bit rate is $R_2 \times N_{TX}$, $R_3$ and $R_2$, respectively (here, $R_2$ is a bit rate drawn from MCS2, and $R_3$ is a bit rate drawn from MCS3. Assuming $R_2 \times N_{TX} > R_3 > R_2$, the transmitter selects the MIMO multiplexing method, which is the transmission method that gives the greatest bit rate, and the modulation method and the encoding rate (QPSK, ½) corresponding to MCS2 are selected. Here, when the same bit rate is drawn from the table for the MIMO multiplexing method and another table, a transmission method other than MIMO multiplexing may be adopted from a viewpoint of raising reliability. Further, when the MIMO multiplexing method is adopted, the transmission method control unit 316 may divide the assigned frequency band into two or more frequency blocks, and the frequency blocks may be assigned to two or more users in units of a frequency block.

At step 606 shown in FIG. 20, the selected MCS number (or the contents associated with the MSC number) and the selected multi-antenna transmission method are reported to the receiver through a control channel such as the downlink information channel. The control channel is generated by the control information transmitting unit 320 shown in FIG. 6, and is multiplexed and transmitted to a data channel by the combining unit 314-1 and/or the combining unit 314-2. The receiver demodulates the data channel according to the notified multi-antenna transmission method and MCS (the modulation method and the encoding rate). The control channel may be transmitted only from one antenna. The data channel to be transmitted is encoded (302) by the transmission method control unit 316 shown in FIG. 6 according to the selected encoding rate, and modulated according to the selected modulation method (304). Furthermore, the modulated data channel is provided to one of the beam forming unit 308, the MIMO diversity unit 310, and the MIMO multiplexing unit 312, a process of the selected multi-antenna transmission method is performed, and the data channel is output to the transmission antennas.

Then, step 604 and step 606 are performed. At step 604, a frequency of switching the multi-antenna transmission methods and a frequency of switching the MCS numbers may be either the same or different. A frequency of reporting the reception SIR to the transmitter from the receiver and a frequency of reporting the fading correlation value may be either the same or different. Since fluctuations of fading correlation are often slower than fluctuations of the reception SIR, the frequency of reporting the fading correlation may be reduced.

According to the embodiment, the fading correlation value is measured by the receiver, and measurement results are reported to the transmitter. Nevertheless, the fading correlation value may be measured by the transmitter in either of the cases wherein time division duplex (TDD) is used for transmission and reception (a frequency used by a circuit from the transmitter to the receiver is the same as a circuit in the opposite direction), and wherein conditions of one of the circuits can be approximated by the other circuit. In this case, the transmitter shown in FIG. 6 includes the fading correlation measuring unit 1020 shown in FIG. 23, and the output is provided to the transmission method control unit 316. However, it is desirable to measure the fading correlation value by the receiver, and to feed it back to the transmitter from a viewpoint of accurate measurement of the state of the circuit from the transmitter to the receiver.

Embodiment 2

According to Embodiment 1, the transmitter 300, which typically is the base station, determines a multi-antenna transmission method to be used for communications, and notifies the receiver 1000, which typically is the mobile station. However, the receiver 1000 may determine a multi-antenna transmission method, and notify the transmitter 300 as shown in FIG. 24.

Figure 24:
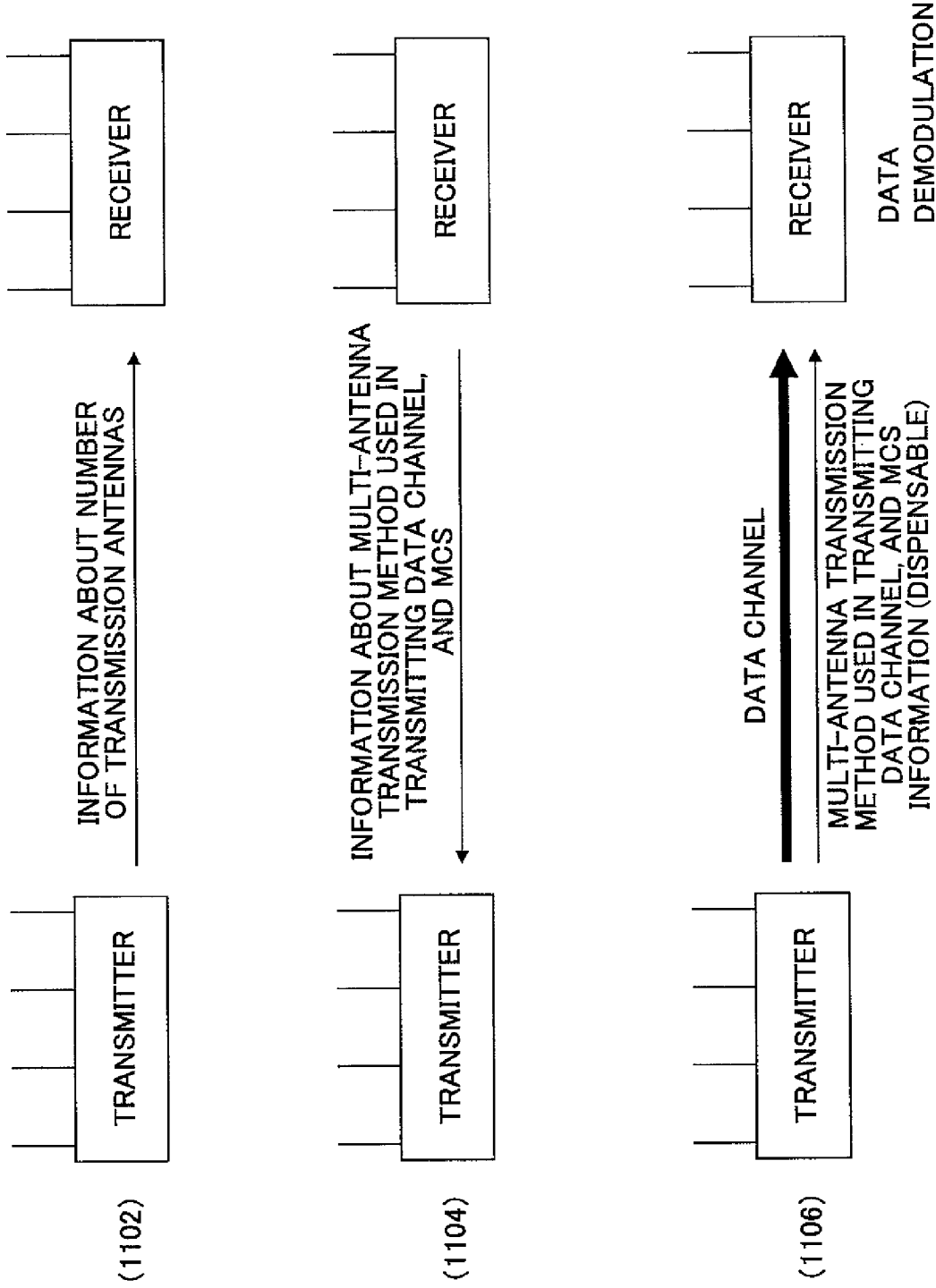
FIG. 24 is a schematic diagram showing the outline of a method according to an embodiment of the present invention.

FIG. 24 illustrates the outline of the method according to Embodiment 2 of the present invention. The number $N_{TX}$ of the transmission antennas is reported to the receiver from the transmitter at step 1102. The number $N_{TX}$ of the transmission antennas does not have to be frequently transmitted to the receiver, but it has to be once reported during communications. For example, it may be once reported at the time of establishment of the radio link to the receiver. The receiver can determine a suitable number of antennas for transmission by knowing the received number $N_{TX}$ of the transmission antennas, and the number NE of the receiving antennas. If, for example, the MIMO multiplexing method is used, the number of antennas to be used is the smaller of the number $N_{TX}$ of the transmission antennas and the number $N_{RX}$ of the receiving antennas. If one of the MIMO diversity method and the adaptive array antenna method is performed, the number of antennas to be used is equal to the number $N_{TX}$ of the transmission antennas.

At step 1104, the receiver transmits a control channel to the transmitter. The control channel includes at least the selected multi-antenna transmission method and the selected MCS number. At step 1104, the multi-antenna transmission method and the MCS number are determined by the receiver based on the reception SIR value and the fading correlation value. According to this embodiment, the tables as described with reference to FIGS. 8 and 23 are stored in a storage unit of the receiver 1000. Since the method of determining the transmission method and the MCS number is the same as the method described above, descriptions are not repeated.

At step 1106, the transmitter transmits the data channel and the control channel to the receiver. The MCS number and the multi-antenna transmission method that are used for the transmission of the data channel are reported to the receiver. The receiver demodulates the data channel according to the reported multi-antenna transmission method and MCS (modulation method and encoding rate).

Embodiment 3

According to Embodiments 1 and 2, an optimal transmission method is selected by one of the transmitter and the receiver out of the three multi-antenna transmission methods. However, the number of choices of the transmission methods may be reduced to two, or alternatively, increased to a number greater than three. For example, a combination (a hybrid) of the MIMO multiplexing method and the MIMO diversity method, and a combination of the MIMO multiplexing method and the beam forming method may be included in the choices of the transmission methods. However, a MCS table as shown in FIG. 23 has to be separately prepared about the added choice(s).

Figure 25:
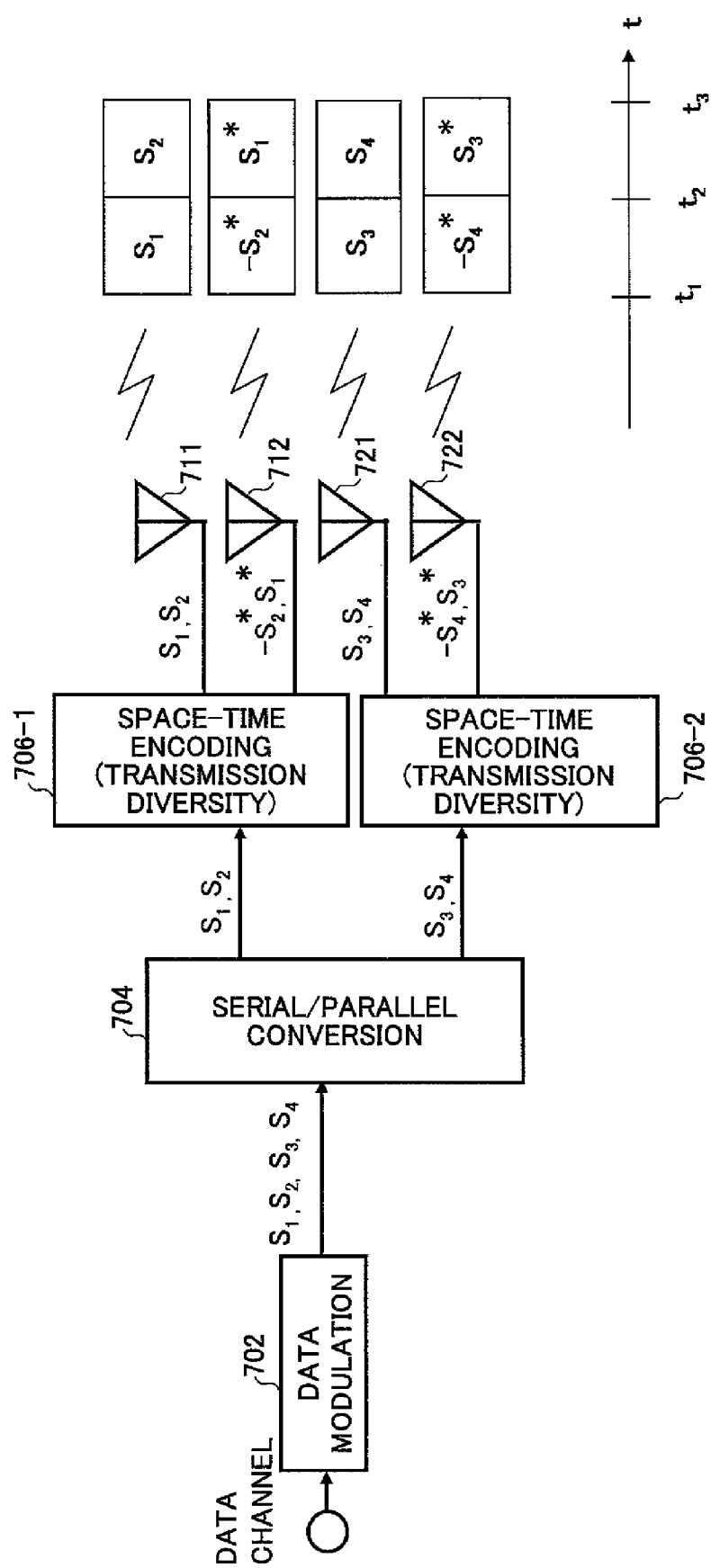
FIG. 25 is a schematic diagram for explaining a transmission method, wherein the MIMO multiplexing method and the MIMO diversity method are combined.

FIG. 25 shows the concept of a combination of the MIMO multiplexing method and the MIMO diversity method. The combination shown in FIG. 25 includes a data modulating unit 702, a serial/parallel converter 704, and first and second space-time coding units (transmitting diversity units) 706-1 and 2, and transmission antennas 711 through 722.

The data modulating unit 702 has the same configuration and the same function as the data modulating unit 304 of FIG. 6. The serial/parallel converter 704 has the same configuration and the same function as the serial/parallel converting unit 319 of FIG. 6. The first and the second transmitting diversity units 706-1 and 2 have the same configuration and the same function as the space-time coding unit 317 of FIG. 6.

When operating, a data channel modulated by the data modulating unit 702 is divided into mutually different symbol sequences by the serial/parallel converter 704, and the symbol sequences are provided to the corresponding space-time coding units 706-1 and 2. For example, demodulated and divided symbol sequences $S_1$, $S_2$, $S_3$, and $S_4$ are converted into two sequences. A first sequence, namely, $S_1$ and $S_2$, is provided to the first space-time coding unit 706-1, and a second sequence, namely, $S_3$ and $S_4$, is provided to the second space-time coding unit 706-2. The first space-time coding unit 706-1 duplicates the input symbols, generates two symbol sequences that have a predetermined correspondence relationship, and transmits them from the corresponding transmission antennas. For example, $S_1$ and $S_2$ in this sequence are transmitted by a first transmission antenna 711; and $-S_2^*$ and $S_1^*$ are transmitted by a second transmission antenna 712. Similarly, the second space-time coding unit 706-2 duplicates the input symbols, generates two symbol sequences that have a predetermined correspondence relationship, and they are transmitted by the corresponding transmission antennas. For example, $S_3$ and $S_4$ in this sequence are transmitted by a first transmission antenna 721; and $-S_4^*$ and $S_3^*$ are transmitted by a second transmission antenna 722. Consequently, the transmitter first transmits $S_1 - S_2^* + S_3 - S_4^*$, and next, transmits $S_2 + S_1^* + S_4 + S_3^*$.

The receiver first receives $R_1 = S_1 - S_2^* + S_3 - S_4^*$, and then, receives $R_2 = S_2 + S_1^* + S_4 + S_3^*$. The receiver performs a signal separating method based on the first received signal $R_1$, and estimates a group of symbols transmitted from the four transmission antennas. Consequently, it is estimated that $S_1$, $-S2^*$, $S3$, and $-S4^*$ are first transmitted from the four transmission antennas. Further, the receiver performs the signal separating method based on the second received signal $R_2$, and estimates a group of symbols transmitted from the four transmission antennas. Consequently, it is estimated that $S_2$, $S_1^*$, $S_4$, and $S_3^*$ are next transmitted from the four transmission antennas. Contents of the two groups of the symbols are essentially the same (only the sign is different, or otherwise, it is a complex conjugate). Accordingly, the receiver can accurately estimate the four symbols $S_1$, $S_2$, $S_3$, and $S_4$.

Here, the beam forming method may be used instead of the MIMO diversity. In this case, the symbols $S_1$ and $S_2$ are transmitted with a directional beam from the antennas 711 and 712; and the symbols $S_3$ and $S_4$ are transmitted with a directional beam from the antennas 721 and 722. The receiver can accurately estimate the transmitted symbols by performing the signal separation and maximum ratio combining.

According to the embodiment, improvement in reliability can be obtained by one of the MIMO diversity and the beam forming methods, while obtaining improvement in the speed of the data transmission by the MIMO multiplexing method. The number of transmission antennas, the number of symbol sequences in parallel, the diversity coding method, etc., may be variously modified in addition to the above.

Embodiment 4

In the embodiments described above, the transmitter capable of performing two or more transmission methods out of the MIMO multiplexing method, the MIMO diversity method, and the adaptive array antenna method is described.

Here, a control method based on feedback when the MIMO multiplexing is selected out of the three multi-antenna transmission methods is described.

For signal separation in the case of MIMO multiplexing, for example, when transmitting QPSK from two antennas, one of two signals transmitted by the two antennas is subject to phase rotation by fading. These signals are mixed and received by the receiver. For example, if fading differs, the signals received are divided into 4×4=16 points. Generally, in MIMO multiplexing, if there is a fading correlation, the characteristic is degraded. In order to solve this problem, the phase angle is beforehand rotated, and the signal is transmitted from the transmitter.

Figure 26A:
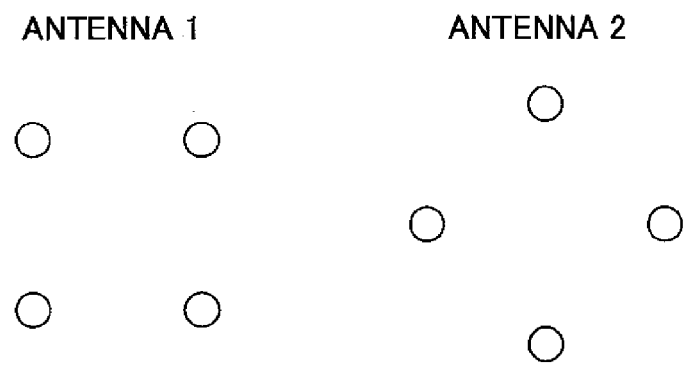
FIG. 26A is a schematic diagram showing adaptive transmission phase control of the MIMO multiplexing method.

For example, in the case of the MIMO transmission (data modulation by QPSK) with two antennas as shown in FIG. 26A, it is shown (by, for example, Non Patent Reference 3) that the characteristic is improved by rotating one of the signals transmitted by the two antennas by 45° when the correlation value is 1.

According to this embodiment, closed-loop transmission phase control is performed for compensating for characteristic degradation due to a great fading correlation between the transmission antennas, rather than simplifying received signal detection like E-SDM on the premise of detecting a signal on MLD base.

Although it is conceivable that antenna correlation is measured by the receiver, the magnitude of the correlation is fed back, and the phase angle is adjusted accordingly, and an optimal transmission phase angle is the same, i.e., independent of the fading correlation. That is, the effectiveness of changing the transmission phase angle according to the fading correlation value is small. For example, a transmitting station, for example, the base station, having four antennas transmits with, e.g., 16QAM using the four antennas to a terminal that is located near the base station, and receives with four antennas; and the base station transmits with, e.g., QPSK from the four antennas to a terminal that is located far from the base station.

Figure 26B:
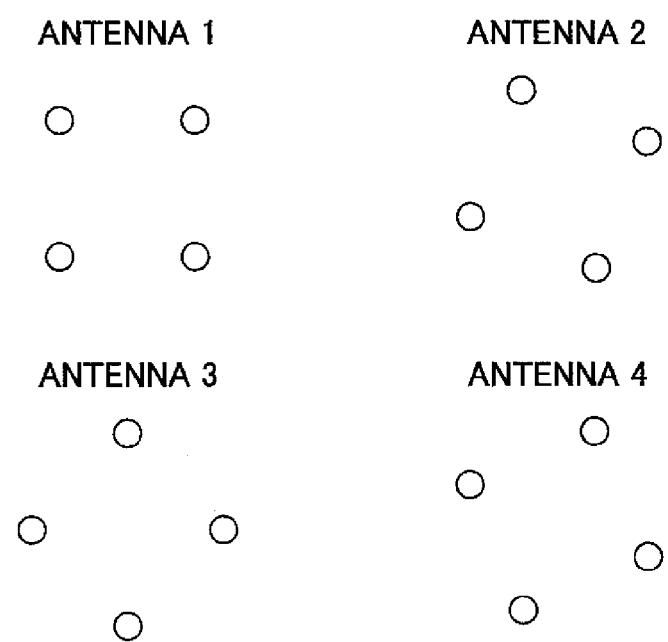
FIG. 26B is a schematic diagram showing adaptive transmission phase control of the MIMO multiplexing method.

When transmitting with QPSK from the four antennas, a 22.5° (90°/4) rotation as shown in FIG. 26B is optimal.

Further, even if the terminal is located near the base station, if the terminal uses two antennas, transmission is performed with, e.g., 16QAM from two antennas.

Further, in MIMO multiplexing, when the fading correlation between the transmission antennas is small, on the reception side, the signal transmitted from each transmitter can be detected from the received signal. For example, as shown in FIG. 27A, points of a transmitted signal X and a transmitted signal Y are determined by a receiving signal Z.

On the other hand, if the fading correlation between the antennas becomes great (i.e., approaching 1), on the receiver side, it is difficult to detect signals transmitted by each transmitter from the received signal. For example, as shown in FIG. 27B, in some transmitting patterns, the transmitted signal X and the transmitted signal Y cannot be uniquely recognized from the received signal Z.

Therefore, signal separation becomes difficult if the fading correlation between the antennas becomes great.

Next, the configuration of the transmitter according to the embodiment is described with reference to FIG. 28.

In the transmitter according to the embodiment, a phase rotation is predetermined according to the number of transmission antennas of the terminal and the modulation method of each antenna, and transmission is carried out with the phase rotation. Specifically, the base station determines the number of the antennas and MCS based on the number of antennas and information about CQI transmitted from the mobile station. For this purpose, the phase rotation is predetermined, and the phase rotation, the number of antennas, and the information on CQI are associated and stored in the mobile station and the base station.

Further, a transmitting RF circuit is calibrated. In the transmitter, processes until data modulation are performed at baseband, i.e., a digital signal. Then, in order to transmit an electric wave, D/A conversion is carried out and the digital signal is changed into an analog signal, and is transmitted on a carrier frequency. In MIMO multiplexing, the RE circuit is prepared for each antenna. However, each RF circuit does not give the same phase rotation. Therefore, even if optimization is carried out on the digital signal, the phase rotation cannot be made the same in the RF circuits. Therefore, according to the embodiment, the phase rotation is beforehand measured, and the phase rotation is compensated for.

A transmission apparatus 400 according to the embodiment includes a determining unit 412 for determining the number of transmission antennas and MCS, a RF calibrating unit 402 to which data and a pilot signal are input, a data modulating unit 404 connected to the RF calibrating unit 402, a phase rotating unit 406 serving as phase rotation compensation means connected to the data modulating unit 404, a RF unit 408 connected to the phase rotating unit 406 and including an antenna, a phase rotation table 410 as phase rotation determination means, and a RF circuit calibrating unit 414.

The numbers of the RF calibrating units 402, the data modulating units 404, the phase rotating units 406, and the RF units 408 are equal to the number of the antennas.

The RF circuit calibrating unit 414 is connected to the RF calibrating units 402 and the RF units 408.

Further, the determining unit 412 is connected to the data modulating units 404 and the phase rotation table 410. The phase rotation table 410 is connected to the phase rotating units 406.

Feedback information from the mobile station is provided to the determining unit 412. For example, the mobile station transmits information that shows CQI and the number of antennas as the feedback information.

The determining unit 412 determines a transmission antenna MCS of each antenna, and provides a number that identifies the determined MCS to the data modulating units 404 and the phase rotation table 410.

The phase rotation table 410 provides information that shows a phase rotation of a data symbol as a phase rotation of each antenna to the phase rotating unit 406. In the phase rotation table 410, the number of transmission antennas, MCS, and the phase rotation to each antenna are associated and held.

On the mobile station side, although the transmission phase difference of the data and the pilot has to be known, since a transmission phase angle uniquely corresponds to the number of antennas and MCS, transmission phase information does not have to be separately transmitted as the control information.

The RF circuit calibrating unit 414 provides calibration factors of the antennas (subcarriers) to the corresponding RF calibrating units 402. The RF calibrating units 402 perform calibration according to the corresponding calibration factors.

The phase rotating unit 406 compensates for the phase rotation according to the phase rotation. A signal that is phase rotated is D/A converted, and transmitted by the RF unit 408.

As described above, the transmission side, for example, the base station, controls the phase to the predetermined optimal phase angle that is beforehand defined according to the number of the antennas and the modulation multiple value after performing the calibration of the transmitting circuit, rather than the transmission side performing phase control based on a result of receiving phase angle measurement on the terminal side.

Figure 29:
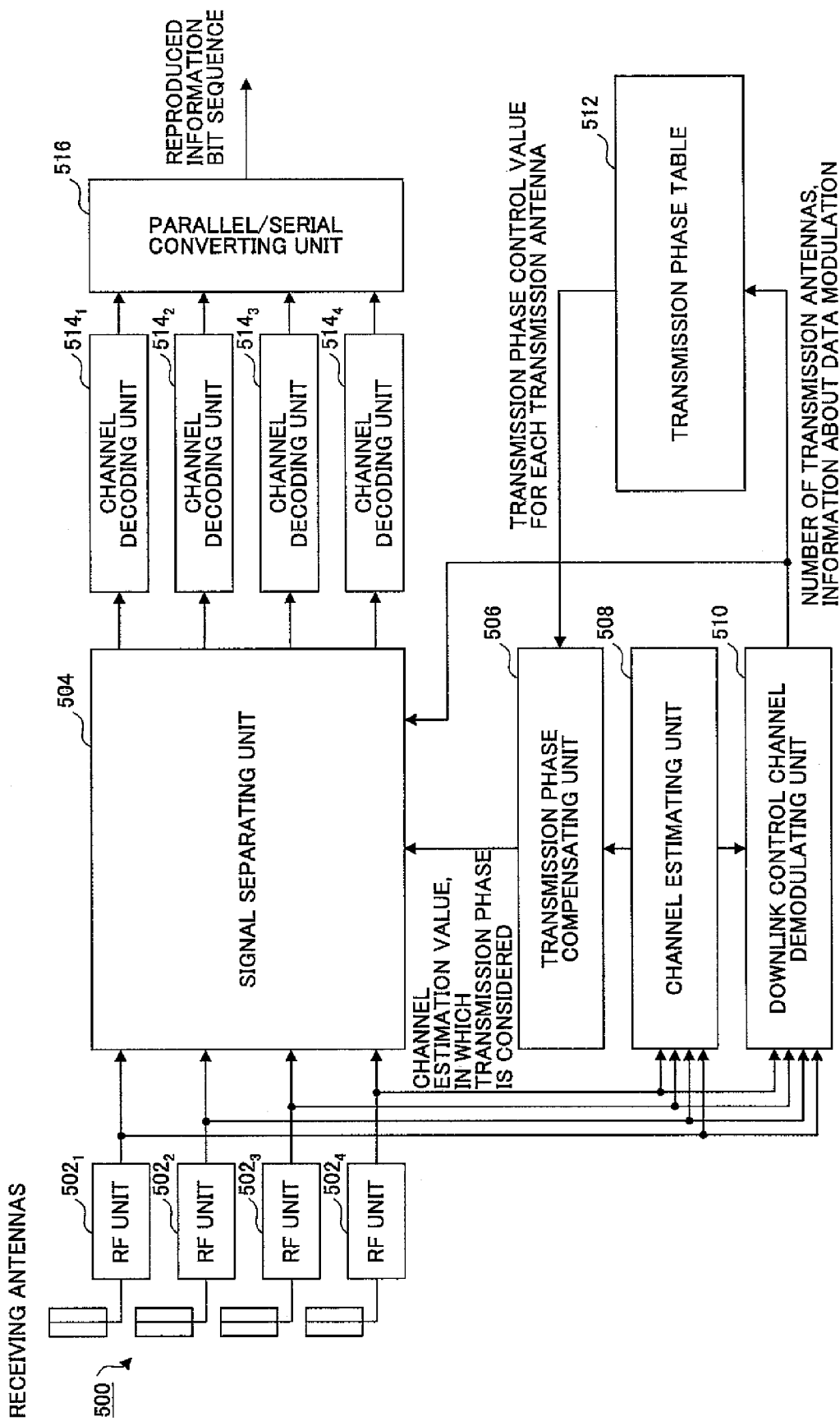
FIG. 29 is a block diagram of a transmission apparatus for performing adaptive transmission phase control of the MIMO multiplexing method.

Next, the receiving unit according to the embodiment is described with reference to FIG. 29.

A receiving unit 500 according to the embodiment includes a RF unit 502 that includes an antenna, a signal separating unit 504 connected to the RF unit 502, a channel estimating unit 508, a downlink control channel demodulating unit 510, a transmission phase compensating unit 506 connected to the channel estimating unit 508, a transmission phase table 512 as transmission phase memory means connected to the transmission phase compensating unit 506 and the downlink control channel demodulating unit 510, a channel decoding unit 514 connected to the signal separating unit 504, and an parallel/serial converter 516 connected to the channel decoding unit 514. The transmission phase table 512 stores phase rotation amounts used for the signal transmitted from the transmission antenna for each data modulation method and the number of transmission antennas.

The signal separating unit 504 is connected to the transmission phase compensating unit 506 and the downlink control channel demodulating unit 510. The RF unit 502 and the channel decoding unit 514 are prepared for each of the antennas.

A received signal is processed by the RF unit 502, and is provided to the signal separating unit 504, the channel estimating unit 508, and the downlink control channel demodulating unit 510.

The channel estimating unit 508 performs channel estimation using a pilot symbol, and a channel estimation value is provided to the transmission phase compensating unit 506 and the downlink control channel demodulating unit 510.

The downlink control channel demodulating unit 510 demodulates a downlink control channel, and information showing the number of transmission antennas and data modulation information are provided to the signal separating unit 504 and the transmission phase table 512.

The transmission phase compensating unit 506 acquires a transmission phase control value serving as a phase rotation amount for each transmission antenna from the transmission phase table, compensates for the transmission phase angle of the channel estimation value, and provides the channel estimation value, the transmission phase angle of which has been compensated for, to the signal separating unit 504. For example, the transmission phase compensating unit 506 rotates the phase of each channel estimation value by a transmission phase rotation θ of a corresponding transmission antenna.

The signal separating unit 504 separates the received signal that has been processed by the RF unit based on the channel estimation value, which has been compensated for the phase angle, the number of transmission antennas, and data modulation information, and provides the separated signal to the channel decoding unit 514.

The channel decoding unit 514 decodes the provided signal, and provides the demodulated signal to the parallel/serial converter 516.

The parallel/serial converter 516 performs parallel-to-serial conversion of the provided signals. Consequently, an information-bit series is obtained.

Next, the compensation of the transmission phase angle for the channel estimation value in the receiving unit 500 described above is detailed with reference to FIG. 30. In FIG. 30, an example of two-antenna transmission is shown, wherein two antennas transmit with QPSK data modulation, and only one receiving antenna is shown.

A transmission signal point of the downlink pilot symbol is fixed, independent of the transmission phase control value of the data symbol. This is because the downlink pilot symbol is used for purposes such as cell detection of other users, and channel state estimation, in addition to demodulation of the user data.

On the other hand, in the receiving apparatus 500, fading fluctuation between the transmission antennas and the receiving antenna is estimated based on the received signal points of the pilot symbol.

Here, since the phase angle of the data symbol of the antenna 2 is rotated by θ with reference to the pilot symbol, the sum of a fading fluctuation value 2 estimated based on the pilot and θ is considered to serve as an estimated fading value of the data symbol. Then, demodulating (signal-separating) is carried out by performing the same receiving process as performed when there is no phase rotation of the data modulation of each antenna of the transmitting apparatus.

Although the preferred embodiments of the present invention are described above, the present invention is not necessarily limited to these, and various changes and modifications are possible within the limits of the scope of the present invention. Although the present invention is described with several embodiments, this is only for convenience, severance of the embodiments is not essential to the present invention, and one or more embodiments may be used as needed.

The present international application claims the priority based on Japanese Patent Application No. 2005-105494 filed on Mar. 31, 2005, and uses all the contents thereof for the present international application.

The present international application claims the priority based on Japanese Patent Application No. 2005-174393 filed on Jun. 14, 2005, and uses all the contents thereof for the present international application.

The present international application claims the priority based on Japanese Patent Application No. 2005-241904 filed on Aug. 23, 2005, and uses all the contents thereof for the present international application.

The invention claimed is:

1. A radio communication apparatus that includes a plurality of antennas, comprising:
   a receiving unit configured to receive a notice signal from a communication partner;
   a plurality of units configured to adjust the number of data sequences according to each of two or more transmission methods including a MIMO multiplexing method, a MIMO diversity method, and an adaptive array antenna method, and to couple with the two or more antennas;
   a selecting unit configured to select at least one of the plurality of units based on the notice signal; and
   a transmitting unit configured to notify the communication partner of the transmission method corresponding to the selected unit and transmit data according to the selected unit,
   wherein the transmitting unit performs adaptive modulation independently for each transmitting block and performs HARQ processing independently for each transmitting block, when the data are transmitted according to the MIMO multiplexing method,
   wherein the transmitting unit transmits as a control channel for each group into which the plurality of antennas are divided based on a channel state:
      information about at least one of a bit for AMC, a bit for HARQ, a bit for scheduling, and a bit for CQI for MIMO,
      at least one of a modulation scheme and transport block information expressed as an absolute value, as the bit for AMC for a first antenna,
      at least one of a modulation scheme and transport block information expressed as a difference value relative to the first antenna, as the bit for AMC for a second antenna,
      at least one of HARQ process information, a redundant version, a constellation pattern version, and information indicating whether the data are new as the bit for HARQ,
      a CQI bit expressed as an absolute value, as the bit for CQI for MIMO for the first antenna,
      a CQI bit expressed as a difference value relative to the first antenna, as the bit for CQI for MIMO for the second antenna, and
      frequency block assignment information as the control channel.

2. The radio communication apparatus as claimed in claim 1, wherein the notice signal contains information that shows a received signal quality at the communication partner.

3. The radio communication apparatus as claimed in claim 1, wherein the notice signal contains information that shows similarity of fading that influences a plurality of radio propagation paths corresponding to the antennas.

4. The radio communication apparatus as claimed in claim 1, wherein the notice signal contains information that shows the number of antennas used by the communication partner.

5. The radio communication apparatus as claimed in claim 1, further comprising:
   a computing unit configured to compute similarity of fading that influences the radio propagation paths corresponding to the antennas.

6. The radio communication apparatus as claimed in claim 3, wherein the similarity of fading is estimated by a correlation value of fading characteristics about each of the radio propagation paths.

7. The radio communication apparatus as claimed in claim 1, further comprising a storage unit configured to store a table wherein the similarity of fading, the received signal quality, the modulation method, and an encoding rate of radio propagation paths are associated.

8. The radio communication apparatus as claimed in claim 7, wherein the table is prepared for each choice available for the selecting unit.

9. The radio communication apparatus as claimed in claim 7, wherein the selecting unit selects a transmission method by determining a combination of the modulation method and the encoding rate drawn from the table, which combination gives no smaller bit rate than others.

10. A radio communication method for a multi-antenna system, comprising the steps of:
    receiving a notice signal from a communication partner;
    selecting at least one of a MIMO multiplexing method, a MIMO diversity method, and an adaptive array antenna method based on the notice signal; and
    notifying the communication partner of the selected transmission method, and transmit data according to the selected transmission method,
    when the data are transmitted according to the MIMO multiplexing method the transmitting step comprises performing adaptive modulation independently for each transmitting block and performing HARQ processing independently for each transmitting block,
    wherein the transmitting step comprises transmitting, as a control channel for each group into which a plurality of antennas are divided based on a channel state:
       information about at least one of a bit for AMC, a bit for HARQ, a bit for scheduling, and a bit for CQI for MIMO,
       at least one of a modulation scheme and transport block information expressed as an absolute value, as a bit for AMC for a first antenna, at least one of a modulation scheme and transport block information expressed as a difference value relative to the first antenna, as the bit for AMC for a second antenna,
at least one of a HARQ process information, a redundant version, a constellation pattern version, and information indicating whether the data are new data as the bit for HARQ,
a CQI bit expressed as an absolute value, as the bit for CQI for MIMO for the first antenna,
a CQI bit expressed as a difference value relative to the first antenna, as the bit for CQI for MIMO for the second antenna, and
frequency block assignment information as the control channel.

* * * * *